US012738725B2

(12) United States Patent
Hine et al.

(10) Patent No.: US 12,738,725 B2
(45) Date of Patent: Sep. 15, 2026

(54) HIGH-SPEED SWITCHING APPARATUS FOR ELECTROMAGNETIC COILS

(71) Applicant: Helion Energy, Inc., Everett, WA (US)

(72) Inventors: Andrew Hine, Seattle, WA (US); David Kirtley, Seattle, WA (US); Christopher James Pihl, Woodinville, WA (US); James Melvin Pihl, Port Ludlow, WA (US); Jim True, Renton, WA (US); George Votroubek, Monroe, WA (US)

(73) Assignee: Helion Energy, Inc., Everett, WA (US)

( * ) Notice: Subject to any disclaimer, the term of this patent is extended or adjusted under 35 U.S.C. 154(b) by 345 days.

(21) Appl. No.: 18/535,634

(22) Filed: Dec. 11, 2023

(65) Prior Publication Data

US 2024/0113511 A1 Apr. 4, 2024

Related U.S. Application Data

(63) Continuation of application No. PCT/US2022/033319, filed on Jun. 13, 2022.

(60) Provisional application No. 63/209,799, filed on Jun. 11, 2021.

(51) Int. Cl.

| | |
|---|---|
| ***G01V 3/00*** | (2006.01) |
| ***H02H 1/00*** | (2006.01) |
| ***H02H 3/08*** | (2006.01) |

(52) U.S. Cl.

CPC ............ *H02H 3/08* (2013.01); *H02H 1/0007* (2013.01)

(58) Field of Classification Search

CPC .......... G01R 33/56341; G01R 33/4824; G01R 33/5608

USPC .......................................................... 324/309

See application file for complete search history.

(56) References Cited

U.S. PATENT DOCUMENTS

| | | | |
|---|---|---|---|
| 2011/0273818 | A1 | 11/2011 | Wan et al. |
| 2014/0285940 | A1 | 9/2014 | Greither |
| 2014/0300345 | A1 | 10/2014 | Liu |
| 2017/0154747 | A1 | 6/2017 | Bissal et al. |

FOREIGN PATENT DOCUMENTS

| | | |
|---|---|---|
| CN | 100429733 C * | 10/2008 |
| CN | 201393049 | 1/2010 |
| CN | 203259570 U | 10/2013 |

(Continued)

OTHER PUBLICATIONS

Hester "Trippin' How many times can a breaker trip?" 2013; [Retrieved Oct. 25, 2022]. Retrieved from the internet ; pp. 1-3.

(Continued)

*Primary Examiner* — Walter L Lindsay, Jr.

*Assistant Examiner* — Frederick Wenderoth

(74) *Attorney, Agent, or Firm* — Kilpatrick Townsend & Stockton LLP

(57) ABSTRACT

A protection circuit senses when one supply circuit in a group is activating to deliver current to a circuit component and issues firing signals to simultaneously activate other supply circuits in the group. The supply circuits may deliver large currents and high power. The protection circuit may prevent damage to a system that might otherwise occur if one supply circuit in the group activates in isolation.

20 Claims, 8 Drawing Sheets

(56) References Cited

FOREIGN PATENT DOCUMENTS

| | | | | |
|---|---|---|---|---|
| CN | 106659425 A | * | 5/2017 | ........... A61B 5/6823 |
| CN | 110727194 A | | 1/2020 | |

OTHER PUBLICATIONS

International Search Report and Written Opinion in International Application No. PCT/US2022/033319 mailed Nov. 15, 2022, 22 pages.

* cited by examiner

HIGH-SPEED SWITCHING APPARATUS FOR ELECTROMAGNETIC COILS

CROSS-REFERENCE TO RELATED APPLICATIONS

The present application is a bypass continuation of International Application No. PCT/US2022/033319, filed Jun. 13, 2022, entitled "High-Speed Switching Apparatus for Electromagnetic Coils," which claims a priority benefit, under 35 U.S.C. § 119(e), to U.S. Application No. 63/209,799, filed Jun. 11, 2021, entitled "High-Speed Switching Apparatus for Electromagnetic Coils." Each of these applications is incorporated herein by reference in its entirety.

BACKGROUND

Intense magnetic fields may be generated with a plurality of current-carrying electromagnetic coils that are driven with large electrical currents and high voltages from a plurality of supply circuits. Such magnetic fields may be used to confine high-energy particles and/or to accelerate particles or objects to high velocities. In some cases, the intense magnetic fields can be used to confine a plasma. The coils can be located near each other such that they inductively couple to one or more neighboring coils.

SUMMARY

The described implementations relate to protection circuitry (also referred to as a "protection circuit") that can be used to operate a plurality of supply circuits that together apply high voltages and/or large currents to one or more components in a system. The protection circuit can quickly detect when a supply circuit for one or more circuit components (e.g., inductor(s), capacitor(s), electromagnetic coil(s), resistor(s), switch(es), transducer(s), etc.) is activating (e.g., has initiated delivery of current to the circuit component) and can control simultaneous activation of one or more additional supply circuits in the system that deliver current and power to the one or more circuit components and/or additional circuit components in the system. In some cases, in order to prevent damage of system components, the protection circuit causes all supply circuits within a system to activate simultaneously (e.g., at a same time or within a predetermined time of each other such that the outputs from the supply circuits overlap in time). In some cases, in order to prevent damage of system components, the protection circuit causes all supply circuits within a system to activate within a predetermined time of each other, and the outputs from the supply circuits may or may not overlap in time. The protection circuitry can include optical and electrical components that mitigate undesirable effects of electrical noise that might otherwise couple into or create unwanted signals in the protection circuitry and adversely affect operation of the protection circuitry. The protection circuitry can provide simultaneous activation of high-power supply circuits that may power, for example, large inductive coils spaced several centimeters to meters apart and that are arranged to produce intense magnetic fields.

Some implementations relate to a system comprising an electromagnetic coil to produce a magnetic field in response to current flowing in the electromagnetic coil and a plurality of supply circuits coupled to the electromagnetic coil with a plurality of supply lines. Each supply circuit of the plurality of supply circuits can include two input channels such that each supply circuit of the plurality of supply circuits is controllable, by a first input signal on a first input channel of the two input channels or a second input signal on a second input channel of the two input channels, to output at least a portion of the current to the electromagnetic coil for producing the magnetic field. The system can further include a plurality of sensor circuits coupled to the plurality of supply lines, wherein each sensor circuit of the plurality of sensor circuits is configured to detect activation of a supply circuit of the plurality of supply circuits that is coupled to a supply line of the plurality of supply lines to which the sensor circuit is coupled, and wherein the activation comprises initiating delivery of the portion of the current from the supply circuit to the electromagnetic coil through the supply line to which the sensor circuit is coupled. The system can further include a controller coupled to at least one controlled supply circuit of the plurality of supply circuits to provide the first input signal to activate at least the one controlled supply circuit and a protection circuit coupled to the plurality of sensor circuits and to the plurality of supply circuits. The protection circuit can comprise a multi-way input circuit to receive at least one sensor signal from the plurality of sensor circuits that indicates activation of the activated supply circuit and a multi-way output circuit coupled to the multi-way input circuit to output, in response to receipt of the sensor signal by the first multi-way input circuit, at least one firing signal to at least one supply circuit of the plurality of supply circuits other than the activated supply circuit. Each firing signal of the at least one firing signal can be delivered as the second input signal to the at least one supply circuit and causes delivery of the portion of the current from the at least one supply circuit simultaneous with delivery of the portion of the current from the activated supply circuit.

Some implementations relate to a system comprising a plurality of electromagnetic coils to produce a magnetic field in response to a plurality of currents flowing in the plurality of electromagnetic coils and a plurality of supply circuits coupled to the plurality of electromagnetic coils with a plurality of supply lines. Each supply circuit of the plurality of supply circuits can include two input channels such that each supply circuit of the plurality of supply circuits is controllable, by a first input signal on a first input channel of the two input channels or a second input signal on a second input channel of the two input channels, to provide a portion of the plurality of currents to an electromagnetic coil of the plurality of electromagnetic coils that is connected to the supply circuit of the plurality of supply circuits. The system can further include a plurality of sensor circuits coupled to the plurality of supply lines, wherein each sensor circuit of the plurality of sensor circuits is configured to detect activation of an activated supply circuit of the plurality of supply circuits, wherein the activation comprises initiating delivery of the portion of the plurality of currents from the activated supply circuit to an electromagnetic coil of the plurality of electromagnetic coils that is connected to the activated supply circuit. The system can further include a controller coupled to at least one controlled supply circuit of the plurality of supply circuits to provide the first input signal to activate at least the one controlled supply circuit and a protection circuit coupled to the plurality of sensor circuits and to the plurality of supply circuits. The protection circuit can comprise a multi-way input circuit to receive at least one sensor signal from the plurality of sensor circuits that indicates activation of the activated supply circuit and a multi-way output circuit coupled to the multi-way input circuit to output, in response to receipt of the sensor signal by the multi-way input circuit, at least one firing signal to at least one supply circuit of the plurality of supply circuits.

The at least one firing signal can be delivered as the second input signal to the at least one supply circuit and cause or causes delivery of the portion of the plurality of currents from the at least one supply circuit simultaneous with delivery of the portion of the plurality of currents from the activated supply circuit.

Some implementations relate to methods for applying a plurality of currents to at least one electromagnetic coil in a system to produce a magnetic field. Such methods can include acts of: monitoring, with a protection circuit, for a sensor signal from a plurality of sensor circuits that are coupled to a plurality of supply lines that couple a plurality of supply circuits to the at least one electromagnetic coil, wherein the sensor signal indicates activation of a supply circuit of the plurality of supply circuits to deliver a first amount of current from the activated supply circuit to an electromagnetic coil of the at least one electromagnetic coil for producing the magnetic field; receiving, at the protection circuit, the sensor signal from one sensor circuit of the plurality of sensor circuits; and outputting, from the protection circuit to at least one supply circuit of the plurality of supply circuits other than the activated supply circuit, at least one firing signal in response to receipt of the sensor signal that cause or causes the at least one supply circuit of the plurality of supply circuits to deliver a second amount of current to the electromagnetic coil simultaneous with delivery of the first amount of current by the activated supply circuit.

Some implementations relate to a protection circuit comprising: a multi-way input circuit having a plurality of input circuits to receive in parallel a plurality of input signals; a decision circuit coupled to the plurality of input circuits to output a control signal in response to receipt, by any one of the plurality of input circuits, of a first input signal of the plurality of input signals that qualifies as a triggering signal; and a multi-way output circuit coupled to the decision circuit to output a plurality of firing signals simultaneously in response to receiving the control signal from the decision circuit.

Some implementations relate to methods of assembling a protection circuit. Such methods can include acts of: assembling a multi-way input circuit having a plurality of input circuits to receive in parallel a plurality of input signals; coupling a decision circuit to the plurality of input circuits to output a first control signal in response to receipt, by any one of the plurality of input circuits, of a first input signal of the plurality of input signals that qualifies as a triggering signal; coupling a multi-way output circuit to the decision circuit; and configuring the multi-way output circuit to output a plurality of second control signals simultaneously in response to receiving the first control signal from the decision circuit.

Some implementations relate to a system comprising an electrical load to receive current and a plurality of supply circuits coupled to the electrical load with a plurality of supply lines. Each supply circuit of the plurality of supply circuits can include at least one input channel to receive a first input signal that causes the supply circuit of the plurality of supply circuits to provide a portion of the current to the electrical load. The system can further include a plurality of sensor circuits coupled to the plurality of supply lines, wherein each sensor circuit of the plurality of sensor circuits is configured to detect activation of an activated supply circuit of the plurality of supply circuits coupled to a supply line of the plurality of supply lines to which the sensor circuit is coupled, and wherein the activation comprises initiating delivery of the portion of the current to the electrical load. The system can further include a controller coupled to at least one controlled supply circuit of the plurality of supply circuits to provide the first input signal to activate at least the controlled supply circuit and a protection circuit coupled to the plurality of sensor circuits and to the plurality of supply circuits. The protection circuit can comprise a multi-way input circuit to receive at least one sensor signal from the plurality of sensor circuits that indicates activation of the activated supply circuit and a multi-way output circuit coupled to the multi-way input circuit to output, in response to receipt of the at least one sensor signal by the first multi-way input circuit, at least one firing signal to at least one of the plurality of supply circuits other than the activated supply circuit. The at least one firing signal can cause delivery of the portion of the current from the at least one supply circuit simultaneous with delivery of the portion of the current from the activated supply circuit.

Some implementations relate to a system comprising a plurality of electrical loads to receive a plurality of currents and a plurality of supply circuits coupled to the plurality of electrical loads with a plurality of supply lines. Each supply circuit of the plurality of supply circuits can include at least one input channel to receive a first input signal that causes the supply circuit of the plurality of supply circuits to provide a portion of the plurality of currents to an electrical load of the plurality of electrical loads that is connected to the supply circuit of the plurality of supply circuits. The system can further include a plurality of sensor circuits coupled to the plurality of supply lines, wherein each sensor circuit of the plurality of sensor circuits is configured to detect activation of an activated supply circuit of the plurality of supply circuits that is coupled to a supply line of the plurality of supply lines to which the sensor circuit is coupled, and wherein the activation comprises initiating delivery of the portion of the plurality of currents to an electrical load of the plurality of electrical loads that is connected to the activated supply circuit. The system can further include a controller coupled to at least one controlled supply circuit of the plurality of supply circuits to provide the first input signal to activate at least the controlled supply circuit and a protection circuit coupled to the plurality of sensor circuits and to the plurality of supply circuits. The protection circuit can comprise a multi-way input circuit to receive at least one sensor signal from the plurality of sensor circuits that indicates activation of the activated supply circuit and a multi-way output circuit coupled to the multi-way input circuit to output, in response to receipt of the at least one sensor signal by the first multi-way input circuit, at least one firing signal to at least one of the plurality of supply circuits other than the activated supply circuit. The at least one firing signal can cause simultaneous delivery of the portion of the plurality of currents from the at least one supply circuit other than the activated supply circuit with delivery of the portion of the plurality of currents from the activated supply circuit.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar components).

DETAILED DESCRIPTION

In a noisy and/or variable electrical environment, simultaneous and/or correctly-timed activation of supply circuits to provide power (e.g., via pulses of current) to circuit components that require large currents and/or high voltages can be challenging. Carefully controlled activation of supply circuits can also be challenging if there is some external coupling between the components in the system such as inductive coupling between electromagnetic coils that are controlled by different supply circuits within the system. The activation of a supply circuit can be initiation of current and/or power delivery from the supply circuit to one or more components coupled to receive power from the supply circuit. Simultaneous activation of supply circuits can be the activation of two or more supply circuits at the same time or within a predetermined amount of time of each other such that outputs from the supply circuits overlap in time. In some implementations, simultaneous activation of supply circuits occurs when all supply circuits, operated to activate simultaneously, activate to initiate delivery of their currents within a time span having a value in a range between approximately or exactly 1 microsecond and 100 microseconds. For some applications, simultaneous activation of supply circuits occurs when all supply circuits, operated to activate simultaneously, activate to initiate delivery of their currents within a time span having a value in a range between approximately or exactly 100 nanoseconds and 1 microsecond. For some very demanding applications, simultaneous activation of supply circuits occurs when all supply circuits, operated to activate simultaneously, activate to initiate delivery of their currents within a time span having a value in a range between approximately or exactly 50 nanoseconds and 500 nanoseconds. In some cases, if simultaneous and/or correctly-timed activation is not achieved, the system may not perform an intended function and/or components in the system may be damaged.

Figure 1A:
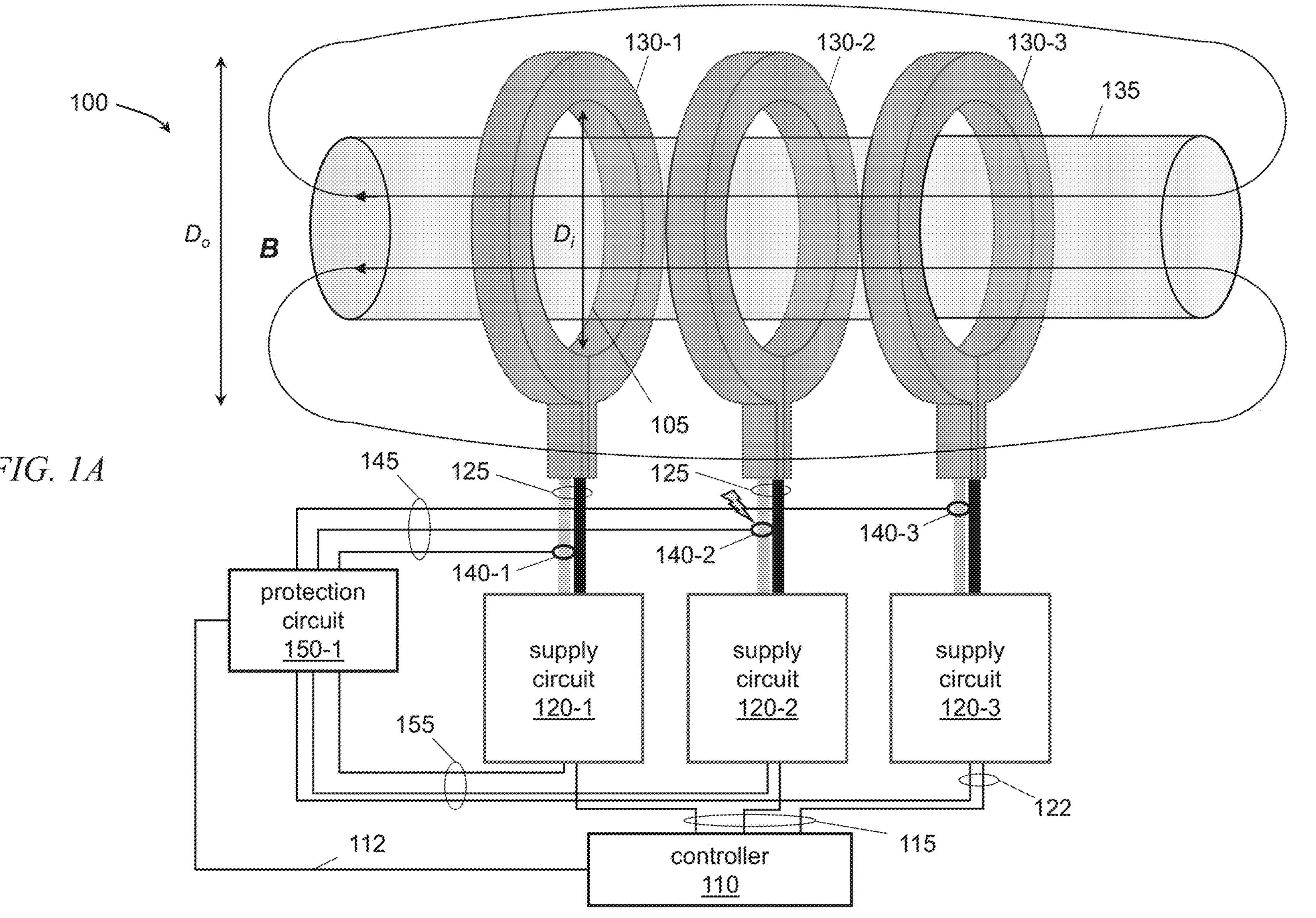
FIG. 1A depicts a system having electromagnetic coils in which a protection circuit may be used to control simultaneous activation of supply circuits that deliver large currents to the electromagnetic coils.

FIG. 1A depicts an example of a system 100 having a plurality of electrical components (e.g., electromagnetic coils 130-1, 130-2, 130-3 which may also be referred to as "loads") that are preferably fired simultaneously with each other and may be fired in a correctly-timed, ordered, firing sequence (e.g., such that each coil fires within a predetermined time of at least one nearest neighbor coil and in a particular order). Firing of a coil 130-1 comprises receiving an amount of current from at least one activated supply circuit 120-1 to circulate around the coil's core (or through core portions of a multi-segmented core). The circulating current produces or participates in producing a desired magnetic field B for the system 100. The received current can be a large pulse of current. The coils 130 can all be fired simultaneously (though not necessarily at the same start time and for the same duration) to participate in producing the magnetic field. Although only three coils are shown in the drawing, the system 100 may have tens, hundreds, or thousands of coils arranged to produce the magnetic field B, all of which are preferably fired according to a precise timing and ordered sequence. The system 100 may be used to accelerate particles or objects or to contain and/or direct flow of a plasma, for example.

To facilitate explanation, a plurality of similar components, such as coils 130-1, 130-2, 130-3 may be referred to by a single, unhyphenated reference number (e.g., "coils 130"). In some instances, a single component of a plurality of components may be referred with its hyphenated reference number (e.g., "coil 130-1") where the single component is referenced as an example and without intent to limit the discussion to only that component. In other instances, which should be clear from the context of the discussion, a single component of a plurality of components may be referred with its hyphenated reference number when describing a feature particular to that component (e.g., a "coil 130-1 located at a first end of the system 100").

The terms "firing" and "activation" and variations thereof are used throughout to refer to related aspects of operation of the system 100. "Activation" is generally used in connection with supply circuits 120 to indicate that a supply circuit 120-1 is delivering current to an electromagnetic coil 130-1, for example, or some other load. "Firing" generally refers to the action at the load (e.g., the delivered pulse of current is passing through the load). In the illustrated example, the firing of an electromagnetic coil produces an intense magnetic field. As such, the supply circuits are activated to deliver currents, thereby firing the coils to produce a magnetic field B. At least three types of signals that relate to activation and firing are used throughout the description. "Sensor signals" come from the sensing circuits 140 and may indicate activation of a supply circuit depending on whether threshold detection is done at the sensor circuit or protection circuit. "Control signals" come from the system controller 110 and may be used to initiate activation of at least one supply circuit 120-1. "Firing signals" come from a protection circuit 150-1 and can be transmitted to at least one other protection circuit 150-2 (see FIG. 1B) or at least one supply circuit 120-1 to initiate activation of the supply circuit and result in the firing of at least one electromagnetic coil 130-1.

Although the system 100 of FIG. 1A includes electromagnetic coils, other systems to which the inventive implementations can apply may not include only electromagnetic coils to which large amounts of current are delivered by one or more of the supply circuits 120. Some systems may not include electromagnetic coils and have other types of electrical loads. Other systems include, but are not limited to, high-intensity lighting systems, high-power lasers, particle accelerators, and segmented railgun systems.

For some apparatuses (such as accelerators, cyclotrons, and instruments to confine energetic plasmas), the coils 130 may be large and carry large amounts of peak current to produce intense magnetic fields. The coils 130 can have an outer diameter $D_o$ from 0.05 m to 4 m, for example, and surround an inner cavity 105 in which the intense magnetic fields are generated. The diameter $D_i$ of the cavity 105 can have a value in a range from 1 cm to 300 cm, for example. There may be different sizes of coils within a system 100. In some implementations, a coil 130-1 can be formed with multiple windings of a conductor such as copper wire or copper cable, though other materials can be used. In some cases, a coil can be machined or molded from a single piece of material (e.g., an alloy of aluminum, copper, steel, a superconducting material, or another metal) to form a single-turn coil. In some cases, a coil 130-1 can be assembled from multiple fractional-turn segments or core portions where each core portion is machined or molded from a single piece of material and powered separately by one or more of the supply circuits 120. Examples of such segmented coils are described in U.S. provisional application Ser. No. 63/210,416 filed on Jun. 14, 2021, titled "Inertially-Damped Segmented Coils for Generating High Magnetic Fields," which application is incorporated herein by reference in its entirety.

The peak current delivered to a coil 130-1 from its supply circuit 120-1 can have a value in a range from 1000 amps (A) to 200,000,000 A, for example, or within any subrange between 1000 A and 200,000,000 A. In some implementations, the peak current delivered to a coil 130-1 from its supply circuit 120-1 can have a value in a range from 500,000 A to 200,000,000 A. The current for the assembly of coils can be provided by supply circuits 120-1, 120-2, 120-3 which may also apply a high voltage across each coil when delivering the current. The applied voltage can be in a range from 5 kilovolts (kV) to 60 kilovolts or more. Each supply circuit 120-1 can include one or more switches to quickly apply voltage across a coil 130-1 and/or drive current through the coil for a brief period of time (e.g., a pulse having a FWHM duration greater than 1 nanosecond but less than 1 second, less than 100 milliseconds, less than 10 milliseconds, or even less than 1 microsecond in some cases) and then switch off to disconnect the supply circuit from the coil. In response to the applied current, the magnetic field produced in the cavity 105 can have a peak value in a range from 0.01 Tesla (T) to 50 T, for example, or within any subrange between 0.01 T and 50 T, such as in a range from 10 T to 40 T. In some cases, the peak current may reach up to $10^9$ amps to produce a magnetic field having a peak value up to 100 T. The inductance of a coil 130-1 can be a value in a range from 10 nanohenries to 10 millihenries, for example. Such electromagnetic coils may be pulsed repeatedly (e.g., at least 1,000 times or at least 10,000 times) with large currents to produce magnetic fields having a peak value in a range from 10 T to 40 T, for example. Protection circuitry 150-1 described herein can provide safe and reliable operation of the system 100 for such a large number of repeated pulses.

The supply circuits 120 may include one or more switches that are controlled, at least in part, by control signals sent from a system controller 110 over control lines 115 to at least one of two input channels 122 of each supply circuit 120-1, 120-2, 120-3. In some cases, the system controller 110 may additionally or alternatively send one or more control signals to the protection circuit 150-1 to initiate activation of one or more supply circuits 120. The controller 110 can include at least one microprocessing chip, at least one microcontroller, at least one field programmable gate array (FPGA), at least one digital signal processor (DSP), at least one application-specific integrated circuit (ASIC), at least one programmable logic controller (PLC) logic circuitry, or some combination thereof.

When the electrical environment is noisy or components in the system 100 have inherently variable operation (which may be referred to as timing jitter), it can be difficult or impossible to always maintain simultaneous and/or correctly-timed activation of the supply circuits 120 during operation of the system 100. As an example, pick-up of electrical noise on control lines 115 or in supply circuitry may prematurely or errantly initiate the activation of one supply circuit (e.g., supply circuit 120-2) for a first coil 130-2 in the system 100 out of a group of supply circuits and/or coils that should activate simultaneously. In some cases, inherently variable (and sometimes premature) activation of switches (such as thyratrons and triacs) can cause one or more supply circuits 120 to activate prematurely. Activating a supply circuit 120-2 may comprise closing one or more switches to initiate delivery of current from the supply circuit to fire the coil 130-2 via a coil supply line 125. In some cases where large currents and high energy are involved, if the first coil's supply circuit activates an excessive amount of time (e.g., more than approximately 300 ns for some coils) prior to supply circuits for neighboring coils 130-1, 130-3 to which the first coil 130-2 may inductively couple, then the first coil 130-2 may draw an excessive peak amount of current from its supply circuit 120-2 and/or it may drive currents in the wrong direction in inductively coupled coils, either of which may damage electrical components (e.g., expensive semiconductor switches, large capacitors, coils, diodes, etc.) in the system 100. By activating effectively in isolation, current flow in the first coil is not impeded as much as would otherwise occur if all the coils fired simultaneously and/or with a correct timing. The reduction in impedance can lead to excessive current being delivered to a system component. In some implementations, premature activation of one supply circuit in a group of supply circuits that deliver current to a same component (e.g., electromagnetic coil) can adversely affect other supply circuits in the group (e.g., create unacceptably high reverse voltages across switches). The tolerable amount of premature activation of a supply circuit can depend upon the inductive components (e.g., coils) used in a system and may be shorter than 300 ns in some cases, though may be longer than 300 ns for some implementations.

To reduce or eliminate the occurrence of a supply circuit activating effectively in isolation in a system 100 (which may have coupled electrical components such as inductively-coupled coils that are driven by the supply circuits), sensors, which can produce sensor signals, and at least one protection circuit 150-1 can be employed to force all supply circuits 120 to activate within an acceptable amount of time after detecting the activation of a first supply circuit 120-2 in the system or within a group of supply circuits. By forcing all supply circuits 120 in a group to activate simultaneously, the system can be operated reliably without damage even though the firing of all coils 130 and/or activation of supply circuits 120 in the group may differ from an intended firing and/or activation time for the group.

FIG. 1A depicts an example of firing-sensor circuits 140-1, 140-2, 140-3 and feedback architecture that may be employed in the system 100 to mitigate errant activation of a supply circuit, such as activating prematurely, in isolation, and/or out of turn in a firing sequence. Firing-sensor circuits 140-1, 140-2, 140-3 can couple to coil-supply lines 125 or to each of the coils 130-1, 130-2, 130-3 to sense the onset of current delivery to any one of the coils 130 indicating that a first supply circuit for that coil is firing. The initiation of current or power delivery indicates that a supply circuit has been activated (either intentionally or errantly) to deliver current or power to the connected coil or load. Sensor signals that are generated by the firing-sensor circuits 140 can be sent to a protection circuit 150-1 over sense signal lines 145. In response to detection of a firing event (which can comprise receipt of a sensor signal from any one of the firing-sensor circuits 140), the protection circuit 150-1 can simultaneously output firing signals over protection signal lines 155 to activate (sometimes referred to as "fire") the other supply circuits 120 in the system 100 (or in a group of supply circuits) causing the other supply circuits to deliver current to the coils within an acceptable amount of time after the activation of the first supply circuit. For example, all of the supply circuits (120-1, 120-2, 120-3) will activate simultaneously, such that their outputs will at least overlap in time.

In some system (which can differ from those described in connection with FIG. 1A and FIG. 1B), in order to prevent damage of system components or to facilitate operation of the supply circuits or the overall system, the protection circuit 150-1 causes all supply circuits within the system (or group of supply circuits, such as in FIG. 1B) to activate within a predetermined amount of time from each other by outputting firing signals within the predetermined amount of time after receiving a sensor signal from a firing-sensor circuit or a firing signal from another protection circuit. The outputs from the supply circuits that receive the firing signals may or may not overlap in time. The predetermined amount of time can be in a range between approximately or exactly 1 microsecond and 100 microseconds. For some applications, the predetermined amount of time can be in a range between approximately or exactly 100 nanoseconds and 1 microsecond. For some demanding applications, the predetermined amount of time can be in a range between approximately or exactly 50 nanoseconds and 500 nanoseconds. The predetermined amount of time may be shorter than 50 nanoseconds or longer than 100 microseconds for some systems.

In some implementations, the protection circuit 150-1 can mitigate damage of supply circuits 120 in the system even if the protection circuit causes activation of only a portion of the other supply circuits within an adequate amount of time after the activation of a first supply circuit. For example, a first supply circuit 120-1 errantly activates (e.g., in advance of an intended activation time) and delivers current to fire the first coil 130-1, and the protection circuit 150-1 manages to deliver a firing signal to the second supply circuit 120-2 in an adequate amount of time to cause the second supply circuit 130-2 to activate and prevent damage to the second supply circuit but fails to provide a firing signal to the third supply circuit 130-3 within the adequate amount of time or at all. In such a case, at least some of the remaining supply circuits (120-2 in this example) would avoid damage by the errant activation of the first supply circuit. In some cases, it may be sufficient to activate only one or more supply circuits connected to one or a selected number of nearest-neighbor coils (or alternative components driven by the supply circuits) to prevent damage to all supply circuits in the system.

FIG. 1A depicts three coils 130, each of which is powered by its own supply circuit. In such an implementation, only one protection circuit 150-1 may be needed to control the simultaneous activation of the system's supply circuits 120. In some cases, the components shown in FIG. 1A may be part of a larger system. There may be M coils in a group and N groups of coils where M and N are positive integers. M may have a value from 2 to 100. N may have a value from 1 to 100. M may be greater than, equal to, or less than N. There can be one or more supply circuits 120 for each coil in the group and there can be one or more protection circuits 150 for each group of coils.

Figure 1B:
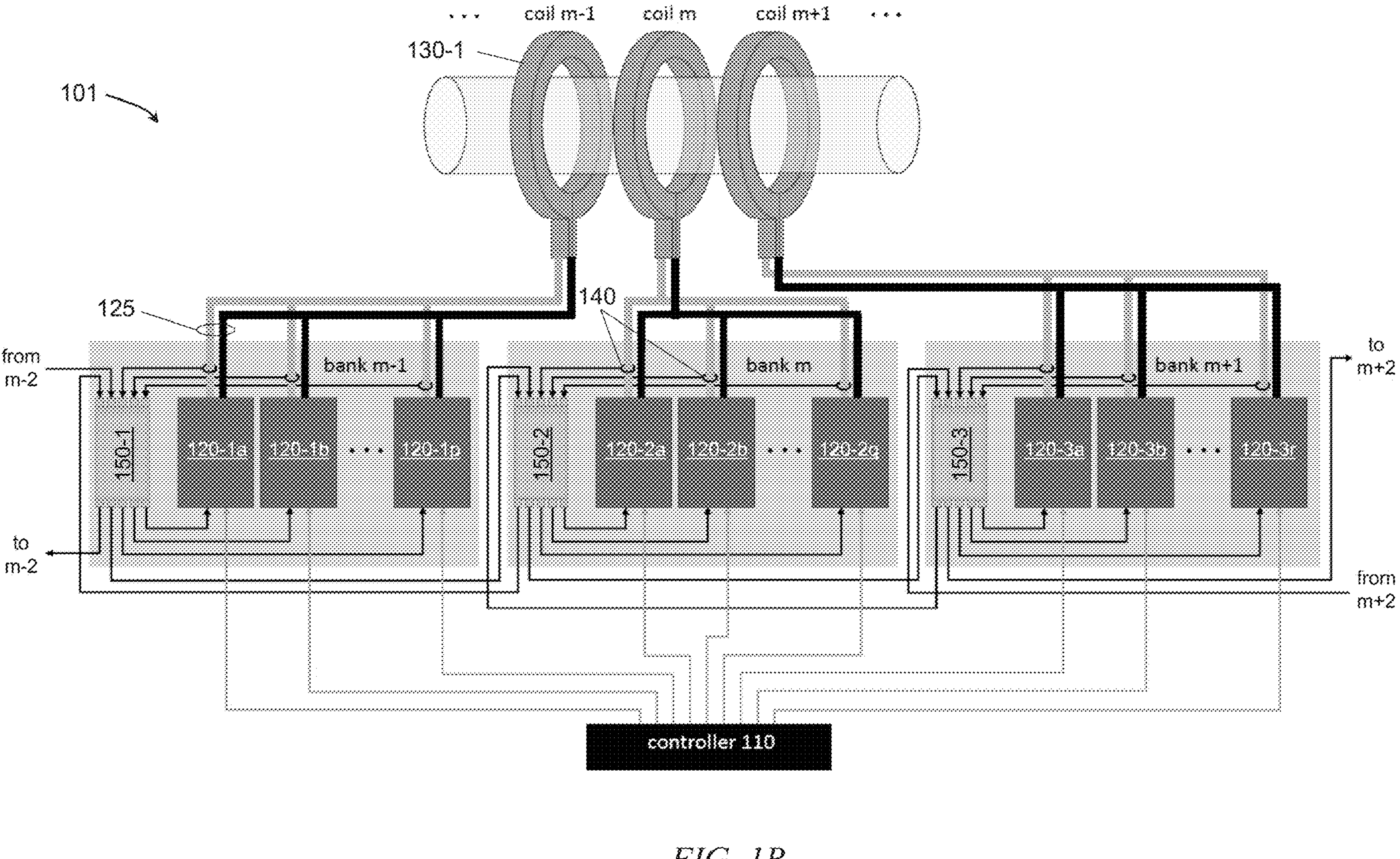
FIG. 1B depicts a system having electromagnetic coils in which multiple supply circuits are arranged to deliver current to each coil. The system may use a plurality of protection circuits to control simultaneous activation of the supply circuits in the system.

FIG. 1B depicts a system 101 having a number of M coils of which only three coils are shown (m−1, m, m+1, where m is a positive integer greater than or equal to 1). Each coil is powered by multiple supply circuits that are arranged in groups or banks (m−1, m, m+1). For example, coil m−1 is configured to be powered by P supply circuits 120-1*a*, 120-1*b*, . . . 120-1*p*. In some cases, a bank of supply circuits may provide current to more than one coil or to more than one core segment of a fractional-turn coil. There may or may not be a same number of supply circuits for each coil.

As depicted in the drawing, firing-sensor circuits 140 can monitor the output from each supply circuit in the system 101 to detect when a supply circuit is activating and initiating delivery of current to a coil. Each bank of supply circuits can include a protection circuit 150-1, 150-2, 150-3. For the implementation of FIG. 1B, each protection circuit (e.g., 150-2) couples to and can receive a sensor signal from any one of the firing-sensor circuits 140 within its bank of supply circuits 120-2*a*, 120-2*b*, . . . 120-2*q* and further connect to and receive a firing signal that is output from at least one other protection circuit (e.g., 150-1) of another bank of supply circuits in the system. The at least one other protection circuit may be one or more nearest neighboring protection circuits (where nearest neighbor is determined in terms of shortest time to propagate a firing signal between the protection circuit and neighboring protection circuits). Each protection circuit is further coupled to at least one supply circuit and configured to output firing signals to each of the supply circuits to which the protection circuit is coupled in response to receiving a sensor signal or firing signal that was generated in the system due to premature activation of a supply circuit. The term "firing signal" is used for both a signal received by a protection circuit and output by a protection circuit. Firing signals output by a protection circuit can be transmitted to at least one other protection circuit and/or to at least one supply circuit to cause activation of at least one supply circuit in the system.

The system of FIG. 1B may operate as follows. Under normal operation, the controller 110 may issue control signals to the supply circuits 120 to cause them to activate at predetermined times (e.g., simultaneously together and/or in a precisely-timed sequence such that outputs from the supply circuits overlap in time) and the supply circuits may activate accordingly. In the event that one of the supply circuits (e.g., 120-2*b*) in a bank of supply circuits activates prematurely (e.g., due to noise or an erratic switch in the supply circuit), then the protection circuit 150-2 for that bank m of supply circuits can detect the premature activation via a sensor signal received from a firing-sensor circuit 140 that monitors the output of the supply circuit 120-2*b*. In response to detecting the premature activation, the protection circuit 150-2 can output firing signals simultaneously to activate the remaining supply circuits 120-2*a*, 120-2*c*, . . . 120-2*q* in the bank m of supply circuits. In some cases, the protection circuit 150-2 can further output firing signals to the inputs of one or more neighboring protection circuits (150-1, 150-3 in this example).

The response time between receipt of the signal (either a sensor signal or firing signal from another protection circuit) that indicates premature activation of the supply circuit and the output of the plurality of the firing signals from the protection circuit 150-2 may be a value in a range from 3 ns to 1 second, for example, or any subrange between 3 ns and 1 second (e.g., from 50 ns to 300 ns or from 10 ns to 300 ns). In other cases, the response time between receipt of the signal indicating premature activation and the output of the firing signals from the protection circuit 150-2 can be from 100 ns to 50 seconds or more, for example in cases where the protection circuit delays a firing signal by a user-selected or programmed amount of time. The protection circuit(s) 150-1, 150-3 of adjacent coils can detect the received firing signal and similarly output firing signals to supply circuits 120 in their groups of supply circuits and output firing signals to one or more neighboring protection circuits. The response time between receipt of a firing signal from a neighboring protection circuit and output of firing signals from the protection circuit (e.g., 150-1 or 150-3) can be the same as for the first protection circuit 150-2, though in some cases the delay of the firing signals may be longer (e.g., if a delay longer than the minimum response time is desired between firing of neighboring coils, where the delay is programmed or selected by a user). In some cases, each protection circuit and/or supply circuit may have a time-out interval occurring after supply circuits in the group or bank for the protection circuit have activated. During the time-out interval, the supply circuits cannot be activated. The time-out interval can prevent a rapid reactivation of supply circuits in the bank due to a firing signal fed back from one or more neighboring protection circuits.

For the implementation of FIG. 1B, a premature activation of one supply circuit can trigger the activation of other supply circuits in the system and/or in a group of supply circuits, such that the supply circuits activate simultaneously. When activating simultaneously, the supply circuits 120 in a bank or in the system can be switched to deliver current to their respective circuit component(s) (e.g., coil) within the bank or system while other supply circuits in the bank or system are delivering current to their respective circuit component(s). Because of the way the protection circuits 150 are connected in the illustrated example, the simultaneous activation can initiate with one bank of supply circuits and propagate along the chain of protection circuits and coils. An alternative implementation of the system 101 in FIG. 1B may have the protection circuit 150-1 for each bank of supply circuits 120 connect to a common protection circuit (not shown) instead of neighboring protection circuits. Outputs from the common protection circuit may then go back to an input of each protection 150-1 circuit in the banks of supply circuits. In this alternative implementation, the premature activation of one supply circuit in one bank of supply circuits will trigger the simultaneous activation of all supply circuits in the other banks of supply circuits.

In some implementations, it may not be necessary for all supply circuits 120 in the system to activate simultaneously or within a predetermined amount of time from each other. For example, it may be sufficient for only those supply circuits (e.g. supply circuits 120-2*a* through 120-2*q*) to activate simultaneously or within a predetermined amount of time from each other to avoid component damage when one of the supply circuits 120-2*b* within the group errantly activates.

Figure 2A:
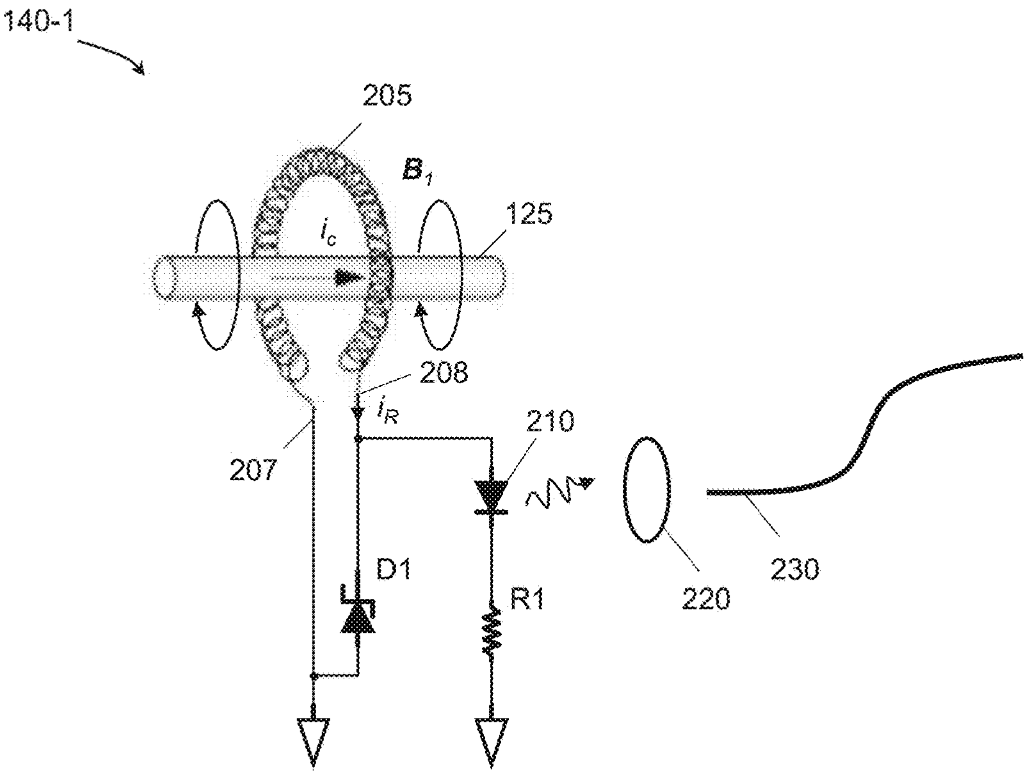
FIG. 2A illustrates an example of a firing-sensor circuit.

FIG. 2A illustrates an example of a firing-sensor circuit 140-1 that can detect when one of the supply circuits 120 in the system 100 is activating (e.g., to deliver current to an electrical load). Activation of a supply circuit 120-1 occurs when a large rise in current $i_c$ initiates in a coil-supply line 125 and the magnetic field B produced by the electromagnetic coil couple to the supply line 125 increases. In some implementations, the increasing flow of current $i_c$ in a coil-supply line 125 can be detected with a Rogowski coil 205 that extends at least part way around at least one of the coil-supply lines 125 as depicted in FIG. 2A. The Rogowski coil may be formed as a toroidal coil or part of a toroidal coil. A change in current $i_c$ through the supply line 125 produces an increasing magnetic field $B_1$ encircling the supply line 125. The increasing magnetic field can drive a current $i_R$ along the Rogowski coil.

To reduce the effect of stray magnetic flux that penetrates a loop formed by the Rogowski coil and its leads 207, 208 (e.g., magnetic flux from another source that flows parallel to the supply line 125), one of the leads may be fed back through the toroidal winding of the Rogowski coil and twisted with the other lead after exiting the Rogowski coil. This can improve the signal-to-noise ratio for the firing-sensor circuits. An example of a lead that is fed back through the toroidal winding is depicted in FIG. 2C.

FIG. 2A depicts a single lead of a coil-supply line 125. In general, a coil-supply line 125 for the systems depicted in FIG. 1A and FIG. 1B comprises at least two lines (send and return lines for current). In some cases, there can be multiple send lines to and multiple return lines from a single electromagnetic coil 130-1 or a group of coils. The Rogowski coil 205 can extend around one or more of the send lines in some cases. Additionally, the Rogowski coil 205 can extend around one or more return lines where the windings of the Rogowski coil 205 on the send and return lines are in opposite directions so that the currents contributed by each Rogowski winding add constructively for the Rogowski coils. By choosing the number of send and/or return coil-supply lines 125 within the Rogowski coil and/or the number of windings in a Rogowski coil, the amount of current $i_R$ generated by the Rogowski coil 205 can be controlled.

The firing-sensor circuit 140-1 can further include an optical diode 210, which may be a light-emitting diode or laser diode. Current $i_R$ generated in the Rogowski coil 205 can be applied to the optical diode 210 to generate light. A turn-on voltage for the optical diode 210 may be between 1 volt (V) and 5 V. The light from the optical diode 210 may be transmitted in free space or coupled into an optical fiber 230 with a coupling optic 220 (e.g., lens, GRIN lens, tapered fiber, mode-field adapter, etc.). In some implementations, the optical fiber 230 may be butt-coupled or pigtailed directly to the optical diode 210 without a coupling optic 220. In some cases, the optical fiber 230 can couple to input circuitry in the protection circuit 150-1 and may serve as a sense signal line 145 so that sensor signals propagate to the protection circuit at essentially the speed of light within the fiber.

For some apparatuses, the current $i_c$ flowing in the coil-supply line(s) 125 can be large enough that a sufficient amount of current $i_R$ can be produced in the Rogowski coil 205 to directly drive the optical diode 210 and produce light without using an amplifier. In some cases, a low-pass RC filter may be placed between the Rogowski coil and a load driven by the coil to control an amount of the current $i_R$ delivered to the optical diode 210. In other cases, an amplifier may be used before the optical diode 210 to amplify the output of the Rogowski coil 205.

The amount of light output from the optical diode 210 can indicate an amount of current $i_c$ flowing in the supply line, though the correspondence may not be a linear relationship over the range of current levels in the supply line 125. A current-limiting resistor R1 having a value between 1 ohm (Ω) and 5000Ω may be included in series with the Rogowski coil 205 and optical diode 210 to avoid overdriving and damaging the optical diode. A Zener diode D1 may also be used and arranged to shunt excess voltage and current that might otherwise damage the optical diode 210. The Zener voltage for the diode D1 may be between 2 V and 100 V. Because the optical diode 210 can be directly driven by current generated in the Rogowski coil 205, the response time to produce an optical sensor signal that indicates activation of a supply circuit can be less than 50 ns in some cases.

Figure 2B:
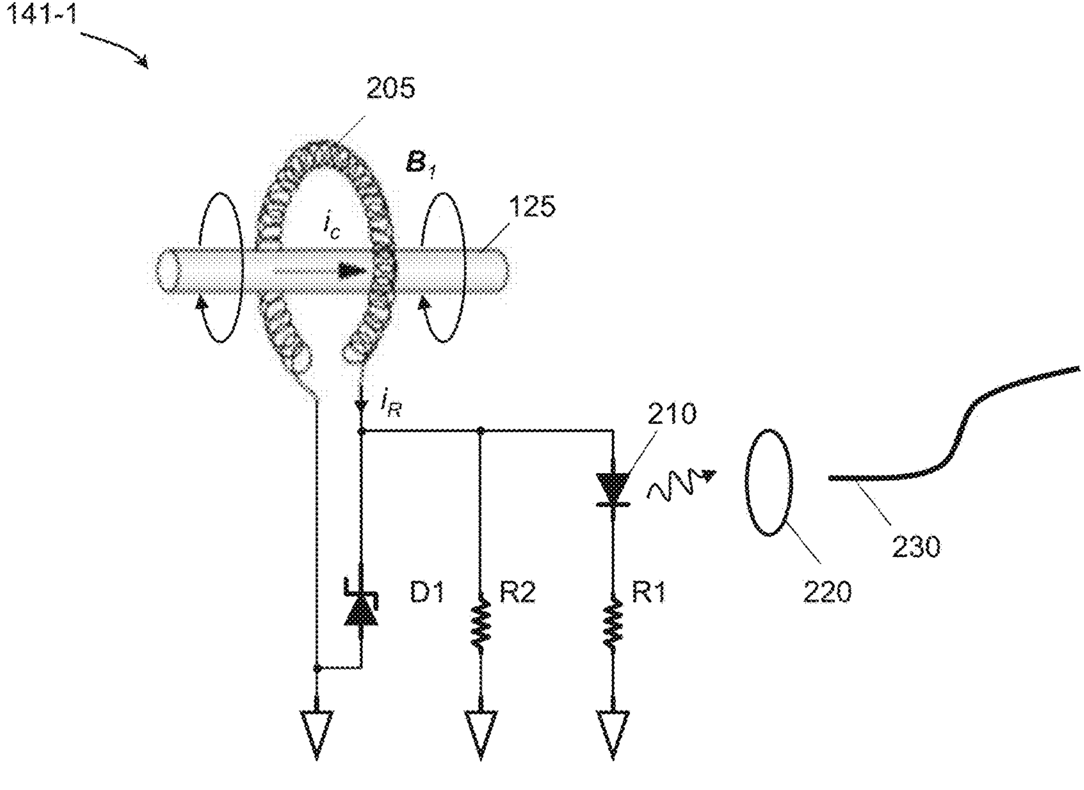
FIG. 2B illustrates another example of a firing-sensor circuit.
Figure 2C:
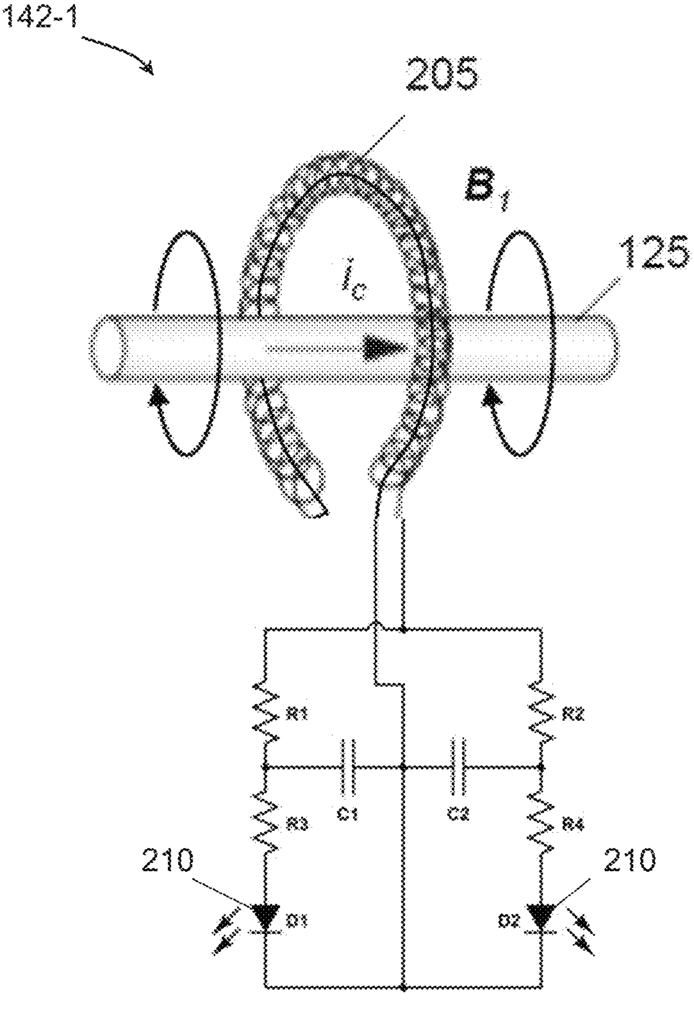
FIG. 2C illustrates another example of a firing-sensor circuit.

FIG. 2B illustrates another example of a firing-sensor circuit 141-1 in which a current divider is used. The current divider comprises resistors R1 and R2, where resistor R1 is in series with the optical diode 210. The value of resistor R1 may be between 1 ohm (Ω) and 5000Ω and the value of resistor R2 may be between 1 ohm (Ω) and 3000Ω. The value of R2 may be less than the value of R1. By using a current divider, the firing-sensor circuit 140-1 has greater design flexibility and the optical diode 210 can be made to turn on and emit light when a predetermined or threshold amount of current $i_R$ flows from the Rogowski coil 205.

As an example, optical diode 210 may be a laser diode that has an optical threshold voltage of 2 V. Zener diode D1 may have a Zener voltage of 9V. The value of R2 can be chosen such that the laser diode may not turn on and emit light until the product $i_R \times$R2 exceeds at least approximately 2 V. Light emitted from the laser diode can be detected via the optical fiber 230 at the protection circuit 150-1. Any detected light can indicate that the monitored supply circuit is activating. Accordingly, the resistor R2 allows adjustment of a thresholding behavior that is designed into the firing-sensor circuit 141-1 of FIG. 2B and the circuit may still have a response time of less than 50 ns. In contrast, the circuit of FIG. 2A may require downstream thresholding circuitry to determine when a sufficient amount of current, indicative of a supply circuit activation, is flowing in the coil-supply line 250. In some implementations, downstream thresholding circuitry can be used for the circuit of FIG. 2A and FIG. 2B.

FIG. 2C depicts an example of a firing-sensor circuit 142-1 that can activate more than one optical diode 210. The optical diodes 210 may operate at a same optical wavelength or emit at different wavelengths. In some cases, the optical diodes 210 may have different threshold values. Outputs from the optical diodes 210 can be coupled into a single optical fiber or same optical path, or the outputs may be sent to different optical receivers by different optical fibers or optical paths. According to some implementations, there can be at least one low-pass filter (e.g., comprising resistors R1, R2 and capacitors C1, C2) connected between the Rogowski coil and the optical diodes 210 to help filter out high-frequency noise.

Figure 3:
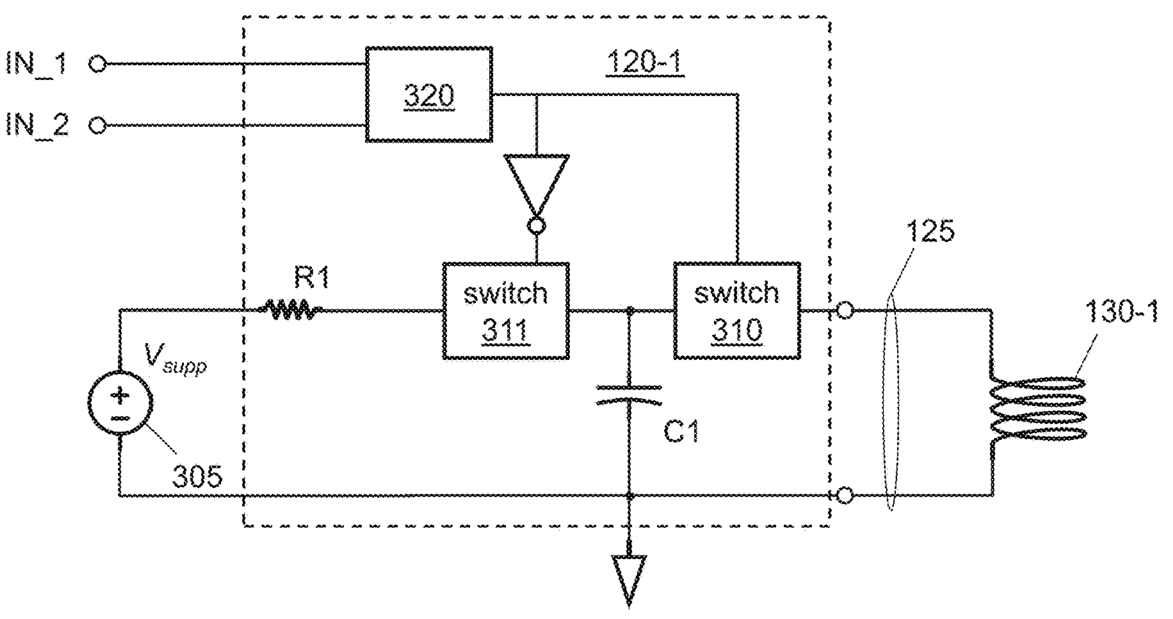
FIG. 3 depicts an example of a supply circuit that may be used to drive current through an electromagnetic coil.

FIG. 3 depicts an example of a supply circuit 120-1 that may be used to drive current through one of the electromagnetic coils 130-1 depicted in the system of FIG. 1A. For the implementation of FIG. 1B, there can be a plurality of the illustrated supply circuits 120-1 connected in parallel to each coil. The supply circuit 120-1 can include a capacitor C1 that may be used to store energy that is later applied to the coil 130-1 when the supply circuit activates. The capacitor C1 may be charged by a source 305 (a current source or voltage source), which may or may not be part of the supply circuit. In some cases, a resistor R1 is used to control a charging rate of the capacitor C1. The source 305 may operate up to a voltage $V_{supp}$ between 10 V and 60 kV. The capacitor C1 can comprise a single capacitor or a bank of capacitors in some cases. The total capacitance of capacitor C1 can be between 1 nanofarad (nF) and 1 farad (F).

The capacitor C1 can connect in series with a switch 310 that closes to apply energy stored in the capacitor C1 to the coil 130-1 when switched from an open state to a closed state. A second switch 311 can be connected between the coil 130-1 and the source 305 to disconnect the source from the capacitor C1 after the capacitor reaches a desired charge. The switches may comprise one or more semiconductor power switches such as, but not limited to, a silicon-controlled rectifier (SCR), thyristor, an insulated gate bipolar transistor (IGBT), vertical-channel power MOSFET, etc. arranged to initiate and stop a large amount of current flowing between the source 305 and/or capacitor C1 and coil 130-1 via supply line 125. The switch 310 can be controlled by an output signal from a dual-input trigger circuit 320, described further below, or may be a self-commutating switch. Although the drawing shows one source (voltage source 305) providing current to charge one supply circuit 120-1, in other cases one source may provide current to charge two or more supply circuits that are connected in parallel to the one source. Each supply circuit can have its own capacitor(s) and switches to connect to at least one coil, and each supply circuit can be configured to deliver energy to at least one coil independently of the other supply circuits. Other examples of supply circuits that may be used with the above-described systems are described in U.S. provisional application Ser. No. 63/196,469 filed on Jun. 3, 2021, titled "Energy Recovery in Electrical Systems," which application is incorporated herein by reference in its entirety.

Figure 4:
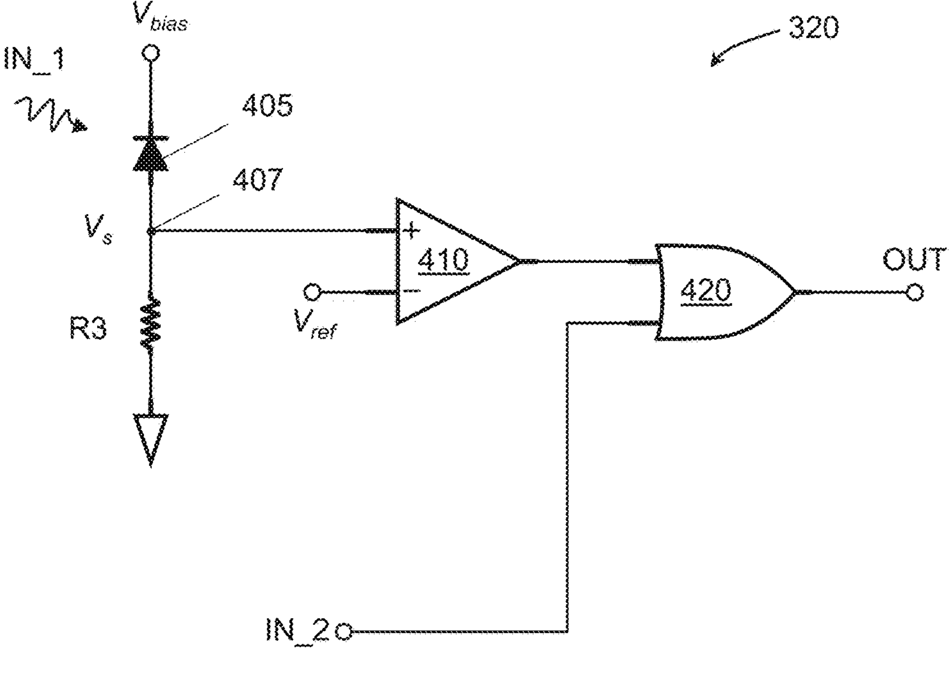
FIG. 4 illustrates an example of a dual-input trigger circuit.

FIG. 4 illustrates an example of a dual-input trigger circuit 320 according to one example implementation. The circuit can include a first input channel IN_1 and a second input channel IN_2. In some cases, the circuit can further include a comparator 410 and logic gate 420 (such as an OR gate as depicted). The output OUT of the trigger circuit 320 can connect to a control terminal of the switch 310, as depicted in FIG. 3.

The first input channel IN_1 of the trigger circuit 320 may receive an optical signal (as illustrated) and convert it to an electrical signal (analog or digital) for some applications. The optical signal may be received over an optical fiber or fiber optic cable, for example. The received optical signal may be a sensor signal from a firing-sensor circuit 140-1 described above or may be a firing signal from a protection circuit 150-1. In other cases, the first input channel IN_1 may receive an electrical input signal instead (e.g., if optical-to-electrical transduction is done prior to the trigger circuit 320). If an optical signal is received, a high-speed photodiode or avalanche photodiode 405 and resistor R3 can be used to convert the optical signal to an analog electrical signal. The photodiode 405 can be connected in series with the resistor R3. The value of the resistor may be between 50Ω and 5000Ω. The photodiode 405 may be reverse biased with a voltage source providing a bias voltage $V_{bias}$. When an optical signal is received, the photodiode 405 can conduct current to resistor R3, elevating the voltage Vs on node 407. In some cases, an amplifier may be used to amplify an output from the photodiode.

In some cases, where signal comparison is not done upstream, the dual-input trigger circuit 320 can include a comparator 410 or Schmitt trigger. An output from the photodiode 405 at node 407 may connect to a non-inverting input of the comparator 410. The voltage Vs can be compared to a reference voltage $V_{ref}$ by comparator 410, which reference voltage serves as a threshold voltage. If Vs exceeds the reference voltage $V_{ref}$, then a high-level output can be provided to the OR gate 420, producing a logic HI output on the trigger circuit's output OUT. The logic HI output signal can activate switches 310, 311 to apply current from the capacitor C1 to the coil 130-1 and disconnect the source 305. If Vs does not exceed the reference voltage $V_{ref}$, then a logic LO voltage output can be provided to the OR gate 420, producing a logic LO output on the trigger circuit's output OUT. The low output signal may return the switch 310 to an off state, or it may not affect a status change if the second input channel IN_2 is at a logic HI state.

In some cases, a comparator 410 may not be used. Instead, the voltage Vs may be applied directly to the input of the OR gate 420, and its digital input circuitry can determine whether the received signal is HI or LO. This can be achieved when the received optical signal at diode 405 is high enough to produce a voltage Vs that exceeds the logic HI threshold of the OR gate.

The second input channel IN_2 of the trigger circuit 320 may receive an electrical input signal (as illustrated) or may receive an optical input signal. If an optical signal is received, then the second input channel may also include at least a photodiode and resistor as included for the first input channel. In some cases, an electrical logic signal can be received by the second input channel IN_2, in which case the signal can be applied directly to a second input of the OR gate 420. The second input channel IN_2 can be used for a control signal, e.g., from the system controller 110, to activate the switch 310 and activate the supply circuit 120-1.

Although a dual-input trigger circuit 320 is described above, an N-input trigger circuit may be used for some applications to allow additional signals to operate the supply circuit 120-1. For such trigger circuits, an N-way OR gate may be used, or a plurality of OR gates may be connected together in a tree structure to form an N-way OR gate. Further, although certain polarities of signals are described herein for a certain action or actions in a circuit, the circuit may be constructed to use opposite polarities and still perform the same overall function or functionalities. For example, inverters, reversing inverting and non-inverting inputs on op-amps or comparators, using opposite polarity voltage supplies, and/or using p-type transistors instead of n-type transistors may be implemented to reverse polarities and achieve a same function or functionalities.

Figure 5:
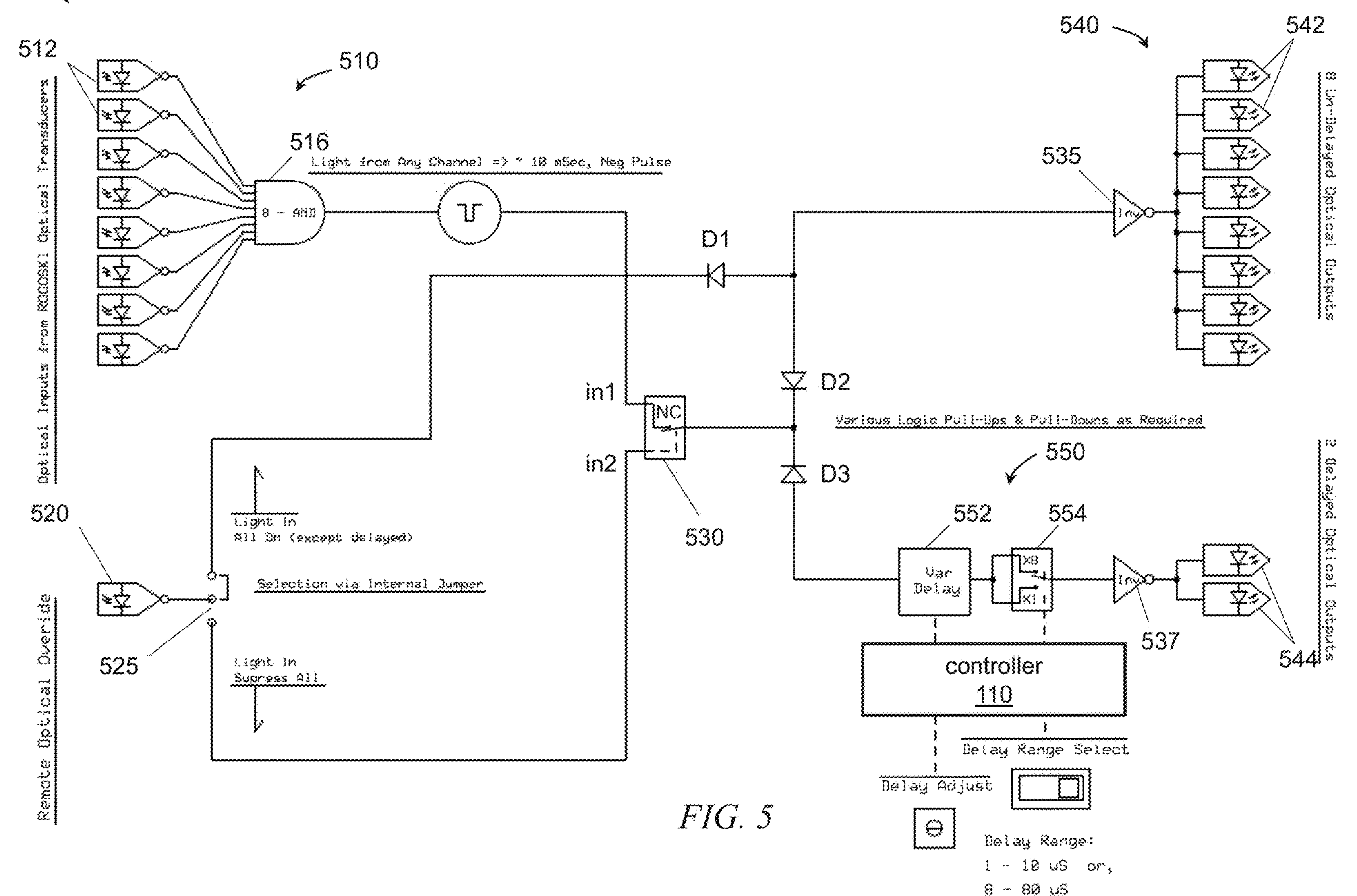
FIG. 5 depicts an example of a protection circuit that has eight inputs to receive sensor and/or firing signals indicating the activation of any one of eight supply circuits, and has eight outputs to transmit firing signals that trigger the activation of the other supply circuits in the group of eight supply circuits.

FIG. 5 depicts an example of a protection circuit 150-1 that can be used in the systems of FIG. 1A and FIG. 1B. The protection circuit 150-1 can include a multi-way optoisolation input circuit 510 having N inputs, a control circuit 520, a switch 530, a multi-way electro-optic output circuit 540, and a programmable-delay circuit 550 having one or more delayed outputs 544. In some implementations, the switch 530, control circuit 520, and delay circuit 550 may be omitted. The illustrated circuit has N=8 input circuits 512 to detect activation of one or more supply circuits in a group of supply circuits and one or more firing signals from one or more other protection circuits. The illustrated protection circuit 150-1 also has N=8 output circuits 542 to apply firing signals simultaneously to supply circuits and protection circuits. In some implementations, there can be a different number of input circuits 512 and output circuits 542. Diodes D1, D2, and D3 may be included to restrict the direction of current flow and/or help isolate sub-circuits from each other. For the illustrated protection circuit 150-1, any one of the eight input circuits 512 can produce a signal (from the input circuit 510 that indicates activation of a supply circuit) that can be passed by the switch 530 to at least activate all output circuits 542 simultaneously. The signal passed by the switch can further activate the delay circuit 550 and delayed outputs 544.

The input circuits 512 and output circuits 542, 544 can be connected through the switch 530. The switch 530 may be controlled with a signal applied to either of two inputs in1, in2. A non-limiting example of such a switch is a normally-closed bus switch. In some implementations, a normally-open bus switch may be used (such as model NC7SZ66 available from ON Semiconductor) to implement a normally-closed switch as described further below.

According to some implementations, the multi-way input circuit 510 can receive at least one optical signal (indicating that a power supply circuit is activating) from any one or more of N separate input circuits 512 and output an electrical logic-level signal (e.g., a HI or LO pulse) from an N-way decision circuit 516. In some implementations, the input circuits 512 can each include an opto-electronic transducer (e.g., photodiode 405, resistor R3, and possibly a comparator 410 as described above in connection with FIG. 4. In some cases, a Schmitt trigger may be used instead of a comparator. If signal comparison is performed at the protection circuit 150-1, then signal comparison may not be used at the dual-input trigger circuit 320. In some implementations, the input circuits can 512 be commercially-packaged optical receivers that digitize a received optical signal to a TTL-compatible electrical signal. Such input circuits may be ANDed together using diodes after each optical receiver. The optical receivers may have an optical sensitivity of −22 dBm and an electrical rise time of about 5 ns.

Outputs from the input circuits 512 can connect directly or indirectly to inputs of an N-way decision circuit 516 (illustrated as an 8-way AND gate in the drawing, though an N-way OR gate may be used in other implementations). Signals from the input circuits 512 may be inverted such that when an input optical signal transitions from a low level to a high level, the output signal from an input circuit 512 transitions from a high level to a low level. In such a case, receipt of a high optical signal at any one of the input circuits 512 can indicate the activation of a supply circuit 120 in the system.

For the illustrated example of FIG. 5, the N-way decision circuit 516 may be implemented as an 8-way AND gate. In some cases, the AND gate may be embodied as eight diodes connected in parallel to the outputs of each input circuit 512 and connected to a common input node of the switch 530. Normally, the 8 outputs from the input circuits 512 are all high when no optical signal is received at any input circuit 512. There may be logic pull-up resistors on the outputs of the decision circuit 516. When an optical signal is received at an input circuit 512, the output of the N-way decision circuit 516 can transition from a first state to a second state (HI to LO in the illustrated example). For example, a received optical signal can temporarily pull the line from the decision circuit 516 to the switch 530 to a LO logic level with a negative-going pulse. The switch may be normally closed so that the negative-going pulse passes through to the output of the switch 530 temporarily pulling the lines to the inverters 535, 537 low. The resulting HI levels from inverters 535, 537 can cause the output circuits 542, 544 to turn on an optical diode in each output circuit an emit an optical signal. The output circuits 542, 544 can be commercially-packaged optical transducers or transmitters that convert a received digital signal into an output optical signal. Output signals from the output circuits 542 can be provided as input signals to first inputs IN_1 of the dual-input trigger circuits 320 in supply circuits 120 for one or more coils and as inputs for one or more other protection circuits. Accordingly, when any one of the N input circuits 512 receives an optical signal, all N output circuits 542 will simultaneously provide firing signals to their respective supply circuits and protection circuits to which the output circuits are coupled. The response time of the protection circuit 150-1, from receipt of an optical signal that qualifies as a triggering signal (e.g., indicates activation of a supply circuit) to output of an optical or electrical firing signal can be a time in a range from 10 ns to 300 ns in some cases.

The negative-going pulse from the input circuits 512 and decision circuit 516 may be blocked by the switch 530 using the second input in2. For example, the jumper 525 coupled to the control circuit 520 can be placed across the lower terminals to connect the control circuit 520 to the switches second input in2. A negative-going output from the control circuit 520 applied to the switch 530 can open the switch, disconnecting the multi-way input circuit 510 from the multi-way output circuit 540 and blocking a pulse received from any one of the input circuits 512.

In some implementations, the protection circuit 150-1 can further include a programmable-delay circuit 550 to provide delayed output firing signals from the delay output circuits 544. The programmable-delay circuit may comprise a fine variable-delay circuit 552 and a stepped delay circuit 554. In some cases, delay values for the variable-delay circuit 52 and stepped-delay circuit 554 may be set manually (e.g., with a potentiometer and switch, respectively). In other cases, each of these two circuits may be controlled by the system controller 110 to select an appropriate delay. The controller 110 may also communicate with the input circuits 512 and control circuit 520 in some cases. For example, the controller 110 may issue one or more control signals to trigger at least one of the input circuits 512 which will produce firing signals transmitted from the output circuits 542. Alternatively, the controller 110 may issue a control signal (e.g., a pulse) to the control circuit 520, when the control circuit is jumpered to couple to the output circuits 542, to produce firing signals transmitted from the output circuits 542.

The variable-delay circuit 552 may comprise a programmable timer (such as the LTC6994 programmable timer available from Analog Devices) to delay a negative-going pulse from the switch 530 from 1 microsecond to as much as 33 seconds. In some cases, a single-shot monostable pulse generator may be used to generate a negative-going pulse of a predetermined length from the pulse received from the switch 530. In other implementations, the variable-delay circuit 552 may comprise one or more synchronized clocks and one or more programmable counters that can delay a trigger edge of a received pulse from the switch 530 by up to 50 microseconds. The stepped delay may comprise a synchronized clock and a single 2-bit counter that can delay a trigger edge by one clock cycle or 8 clock cycles, for example. The delayed pulses output from the delayed output circuits 544 can be used to sequence or correctly time activation of supply circuits in other parts of the system. For example and referring again to FIG. 1B, if coil m is coupled inductively to coil m+1, then coil m and circuitry connected to coil m is protected as long as coil m+1 fires before the current in coil m peaks. This sequence of firing can be achieved by outputting a firing signal to the supply circuit(s) for coil m+1 from an output circuit 542 and outputting a firing signal to the supply circuit(s) for coil m from a delayed output circuit 544.

The protection circuit 150-1 can also include a control circuit 520 that is connectable by a jumper 525 to different portions of the protection circuit. The control circuit 520 can have the same circuit design as the input circuits 512 in some cases, though other circuits may be used to receive and pass a control signal. The control circuit 520 may receive an optical or electrical signal from another source (e.g., system controller 110, another protection circuit) and output an electrical signal to control at least the output circuits 542. In a first configuration of jumper 525, the output from the control circuit 520 can be applied only to the output circuits 542, via diode D1 and inverter 535. This jumper configuration may be used to override the input circuits 512 and/or test the output circuits. In a second jumper configuration, the output of control circuit 520 can be applied to the switch 530 to block the signals from the input circuits 512. The second jumper configuration may be used to disable the protection circuit until a time when the system is ready for operation (e.g., until all supply circuits are in a ready state to commence activating and delivering current). In some cases, the jumper configuration can be set by software, e.g., by code execution on the system controller 110.

Figure 6:
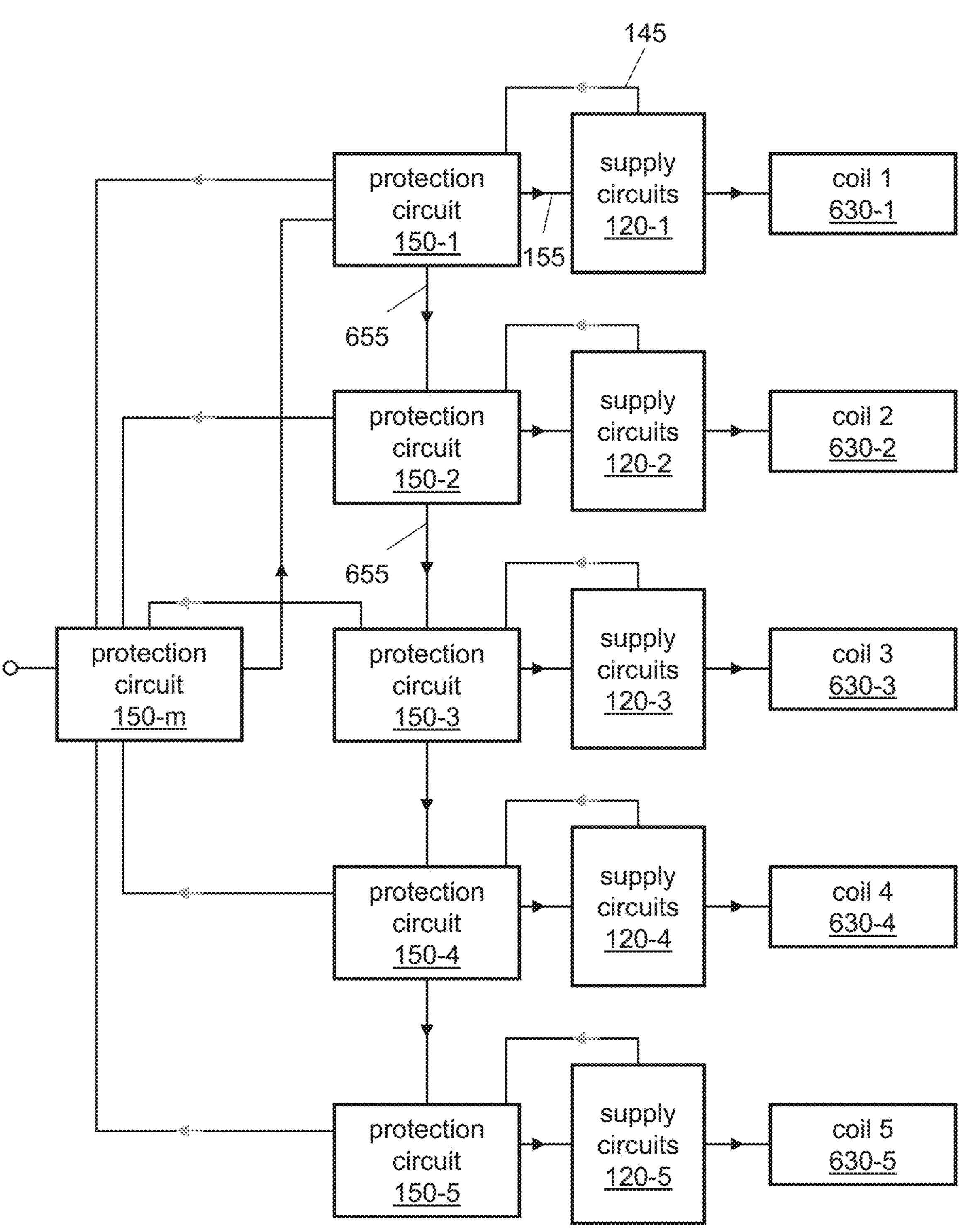
FIG. 6 depicts a system in which protection circuits may be used to delay the activation of power-supply groups in a selected order.

FIG. 6 depicts a system in which protection circuits 150 may be used to intentionally delay or precisely time the activation of supply circuit banks in a selected order. In a large system such as an accelerator or cyclotron, there may be a plurality of supply circuit banks that activate in a selected sequential order with a selected time delay between the activation of each successive bank. In some implementations, propagation delay or delay circuitry in a protection circuit 150-1 can provide the selected time delay. For the implementation of FIG. 6, a master protection circuit 150-*m* can output a firing signal to a first protection circuit 150-1 that controls the activation of supply circuits 120-1 for a first coil 630-1 which in turn issues a firing signal to activate supply circuits 120-2 for a successive coil 630-2 in a firing sequence from coil 1 to coil 5. The first protection circuit 150-1 can output first firing signals over protection signal lines 155 to its supply circuits 120-1 to activate the supply circuits simultaneously in the first bank of supply circuits 120-1. The first protection circuit 150-1 can also output a delayed firing signal over a firing control line 655 to a second protection circuit 150-2, which in turn controls the activation of its supply circuits 120-2 for the second coil 630-2 and signals the activation of supply circuits for the third coil 630-3 in the sequence. The firing signals over the firing control lines 655 may be delayed by the selected time delay for each successive bank of supply circuits (i.e., the desired delay between powering each coil in the sequence). In this manner, the banks of supply circuits for the coil 630-1 through coil 630-5 can be activated in sequence with the selected time delay between the firing of each coil.

During operation, each protection circuit 150-1 through 150-5 can monitor individual supply circuits 120 in their respective bank of supply circuits for the premature or errant activation of any one supply circuit in the group. Should any one supply circuit in a bank activate, the corresponding protection circuit can trigger all other supply circuits in the bank to activate as described above. If the activation of all supply circuits in a bank is out of an overall sequence with other banks of supply circuits (as may be detected by a status signal at the corresponding protection circuit), internal logic circuitry in the protection circuit may not signal a successive bank of supply circuits to activate. The status signal may indicate whether or not a protection circuit has received a firing signal from a prior protection circuit in the firing sequence. Each protection circuit 150-1 through 150-5 can also feedback a status signal to the master protection circuit 150-*m* that indicates the status of the protection circuit (e.g., ready to activate, firing signal received from prior protection circuit, activating a bank of supply circuits out of sequence), so that the master protection circuit 150-*m* can determine when to initiate a subsequent firing sequence.

In some cases, a master protection circuit 150-*m* may communicate with each protection circuit 150-1 through 150-5 directly over separate communication channels or lines. For some implementations, a master protection circuit may control nearest-neighbor banks of supply circuits to activate within a selected time delay when one bank of supply circuits activates prematurely or in error.

For some implementations, such as that shown in FIG. 6, each supply circuit can have a single input (signal line 155) that controls activation of the supply circuit to deliver current and/or power to a connected load. For example, protection signal lines 155 can each carry a firing signal to a single supply circuit in a bank of supply circuits 120-1, and there may be no other input channel (e.g., from a master controller) to each supply circuit in the bank of supply circuits that controls activation of each supply circuit. Of course, combinations of control signals and firing signals are possible in a system. For example, at least one of the protection circuits 150-1 through 150-5 may be controlled by control signals from a controller 110 instead of, or in combination with, firing signals from a master protection circuit 150-*m*. Alternatively, or additionally, at least one of the supply circuits or at least one bank of supply circuits in FIG. 6 can be communicatively coupled to and controlled, at least in part, by a controller 110.

Figure 7:
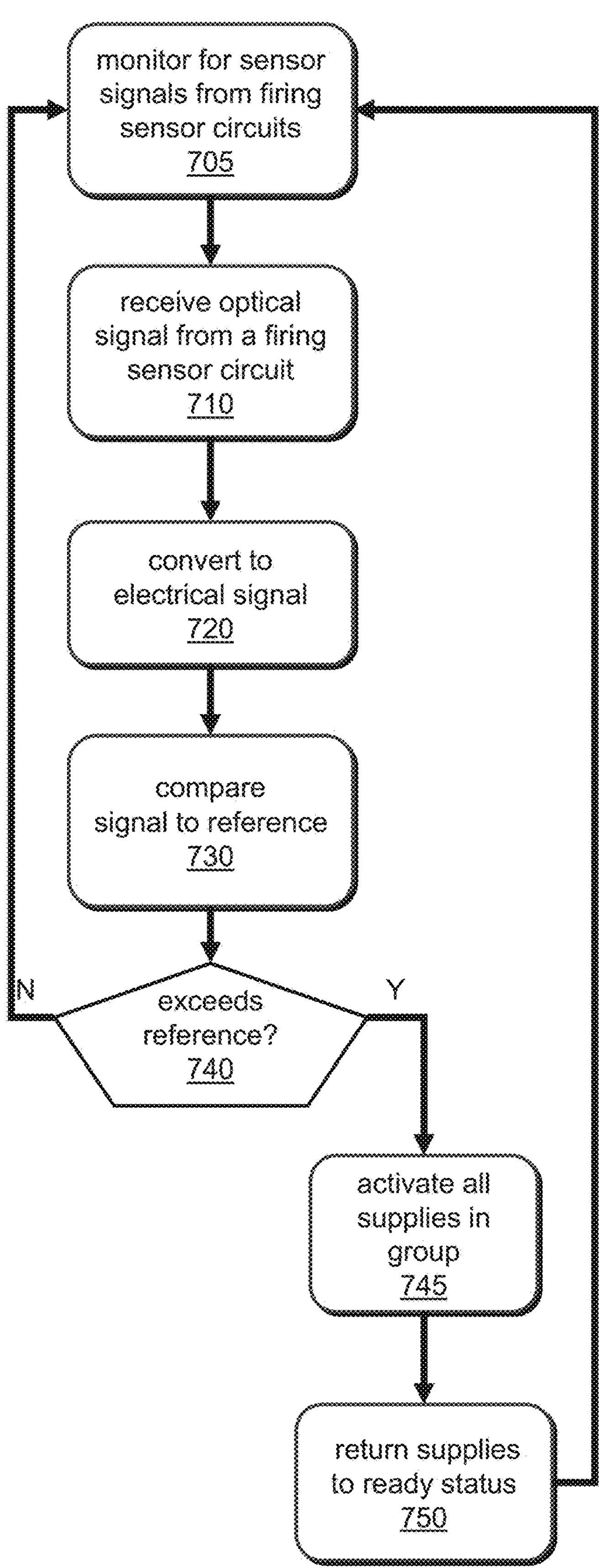
FIG. 7 depicts acts associated with a method of activating supply circuits to deliver power to circuit components in a system.

FIG. 7 depicts acts that may be practiced for methods of activating two or more supply circuits that drive large currents and/or high power. As an example, a method may comprise monitoring (act 705), by a protection circuit 150-1, for at least one sensor signal from two or more firing-sensor circuits 140 during operation of the system, wherein the sensor signal indicates that a supply circuit 120-1 coupled to at least one of the firing-sensor circuits 140-1 is activating. The firing-sensor circuits 140 can sense whether a corresponding supply circuit in the system or within a bank of supply circuits is activating. The method may further include receiving (act 710), by the protection circuit 150-1, an optical sensor signal from one of the firing-sensor circuits 140 at the protection circuit and converting (act 720), by the protection circuit, the optical sensor signal to an electrical analog sensor signal. The method may further include comparing (act 730), by the protection circuit 150-1, the analog sensor signal to a reference value. If the analog sensor signal exceeds the reference (condition 740), then the protection circuit 150-1 may issue (act 745) firing signals to activate two or more other supply circuits 120 in the system or in a bank of supply circuits. The supply circuits and protection circuit may then return (act 750) to a ready status for activating again and return to monitoring (act 705) for at least one sensor signal from the two or more firing-sensor circuits. If the analog sensor signal does not exceed the reference value (condition 740), then the protection circuit may return to monitoring (act 705) for the at least one sensor signal from the two or more firing-sensor circuits. In implementations where determination of a firing signal is performed prior to the protection circuit (e.g., at the firing-sensor circuit as described above), the acts of comparing (act 730) and determining whether the analog sensor signal exceed the reference (condition 740) may not be included in the method of operating the supply circuits.

Implementations of a protection circuit 150-1 described herein can also include methods of assembly. A method of assembling a protection circuit can include acts of assembling a multi-way input circuit 510 having a plurality of input circuits 512 and arranging the input circuits in parallel to receive in parallel a plurality of input signals (e.g., sensor signals and/or firing signals). The input circuits 512 may or may not include circuitry that performs threshold detection to determine if a received signal qualifies as a triggering signal for the protection circuit (e.g., to determine if a received signal indicates the activation of a supply circuit). The method of assembly can further include coupling a decision circuit 516 to the plurality of input circuits 512 to output a first signal in response to receipt, by any one of the plurality of input circuits, of a first input signal of the plurality of input signals that qualifies as a triggering signal. The method can further include coupling a multi-way output circuit 540 to the decision circuit and configuring the multi-way output circuit to output a plurality of second signals (e.g., firing signals) simultaneously in response to receiving the first signal from the decision circuit.

The protection circuits and systems described above and methods of operating the protection circuits and systems can be implemented in different configurations, some examples of which are listed below.

(1) A system comprising: an electromagnetic coil to produce a magnetic field in response to current flowing in the electromagnetic coil; a plurality of supply circuits coupled to the electromagnetic coil with a plurality of supply lines, each supply circuit of the plurality of supply circuits having two input channels such that each supply circuit of the plurality of supply circuits is controllable, by a first input signal on a first input channel of the two input channels or a second input signal on a second input channel of the two input channels, to output at least a portion of the current to the electromagnetic coil for producing the magnetic field; a plurality of sensor circuits coupled to the plurality of supply lines, wherein each sensor circuit of the plurality of sensor circuits is configured to detect activation of a supply circuit of the plurality of supply circuits that is coupled to a supply line of the plurality of supply lines to which the sensor circuit is coupled, and wherein the activation comprises initiating delivery of the portion of the current from the supply circuit to the electromagnetic coil through the supply line to which the sensor circuit is coupled; a controller coupled to at least one controlled supply circuit of the plurality of supply circuits to provide the first input signal to activate at least the one controlled supply circuit; and a protection circuit coupled to the plurality of sensor circuits and to the plurality of supply circuits, the protection circuit comprising: a multi-way input circuit to receive at least one sensor signal from the plurality of sensor circuits that indicates activation of the activated supply circuit; and a multi-way output circuit coupled to the multi-way input circuit to output, in response to receipt of the sensor signal by the first multi-way input circuit, at least one firing signal to at least one supply circuit of the plurality of supply circuits other than the activated supply circuit, wherein each firing signal of the at least one firing signal is delivered as the second input signal to the at least one supply circuit and causes delivery of the portion of the current from the at least one supply circuit simultaneous with delivery of the portion of the current from the activated supply circuit.

(2) A system comprising: a plurality of electromagnetic coils to produce a magnetic field in response to a plurality of currents flowing in the plurality of electromagnetic coils; a plurality of supply circuits coupled to the plurality of electromagnetic coils with a plurality of supply lines, each supply circuit of the plurality of supply circuits having two input channels such that each supply circuit of the plurality of supply circuits is controllable, by a first input signal on a first input channel of the two input channels or a second input signal on a second input channel of the two input channels, to provide a portion of the plurality of currents to an electromagnetic coil of the plurality of electromagnetic coils that is connected to the supply circuit of the plurality of supply circuits; a plurality of sensor circuits coupled to the plurality of supply lines, wherein each sensor circuit of the plurality of sensor circuits is configured to detect activation of an activated supply circuit of the plurality of supply circuits, wherein the activation comprises initiating delivery of the portion of the plurality of currents from the activated supply circuit to an electromagnetic coil of the plurality of electromagnetic coils that is connected to the activated supply circuit; a controller coupled to at least one controlled supply circuit of the plurality of supply circuits to provide the first input signal to activate at least the one controlled supply circuit; and a protection circuit coupled to the plurality of sensor circuits and to the plurality of supply circuits, the protection circuit comprising: a multi-way input circuit to receive at least one sensor signal from the plurality of sensor circuits that indicates activation of the activated supply circuit; and a multi-way output circuit coupled to the multi-way input circuit to output, in response to receipt of the sensor signal by the multi-way input circuit, at least one firing signal to at least one supply circuit of the plurality of supply circuits, wherein the at least one firing signal is delivered as the second input signal to the at least one supply circuit and causes delivery of the portion of the plurality of currents from the at least one supply circuit simultaneous with delivery of the portion of the plurality of currents from the activated supply circuit.

(3) The system of configuration (1) or (2), wherein each sensor circuit of the plurality of sensor circuits includes a Rogowski coil that extends around at least part of one supply line of the plurality of supply lines.

(4) The system of configuration (3), wherein each sensor circuit of the plurality of sensor circuits further comprises an optical diode that receives unamplified current from the Rogowski coil to activate the optical diode and output an optical pulse for the at least one sensor signal.

(5) The system of configuration (4), wherein each sensor circuit further includes a current divider connected to an output of the Rogowski coil, the current divider comprising: the optical diode in series with a first resistor in a first circuit branch of the current divider; and a second resistor in a second circuit branch of the current divider that is in parallel with the first circuit branch, wherein a first resistance value of the first resistor and a second resistance value of the second resistor are selected to determine a threshold condition above which the optical diode will output the optical pulse.

(6) The system of configuration (4) or (5), wherein each sensor circuit of the plurality of sensor circuits further comprises at least one optical fiber to receive the optical pulse from the optical diode and to transmit the received optical pulse to one input of the multi-way input circuit.

(7) The system of any one of configurations (1) through (6), wherein each input of the multi-way input circuit comprises an opto-electronic transducer to convert a received optical sensor signal from a sensor circuit of the plurality of sensor circuits into an electronic signal that produces a pulse which is transmitted to the multi-way output circuit.

(8) The system of any one of configurations (1) through (7), wherein the multi-way output circuit comprises a plurality of transducers to convert received electrical signals into optical firing signals that are output from the protection circuit as the at least one firing signal.

(9) The system of any one of configurations (1) through (8), wherein the protection circuit further comprises: a delay circuit coupled to the multi-way input circuit to output a first signal that is delayed with respect to a second signal received from the multi-way input circuit; and an output circuit coupled to the delay circuit, to receive the first signal and output at least one optical signal that is delayed with respect to the at least one firing signal.

(10) The system of configuration (9), wherein the protection circuit further comprises: a switch connected between the multi-way input circuit and the delay circuit, the switch having a first control input to disconnect the multi-way input circuit from the multi-way output circuit.

(11) The system of any one of configurations (1) or (3) through (10), wherein the electromagnetic coil, the plurality of supply circuits, the plurality of sensor circuits, and the protection circuit belong to a first group of magnetic field-producing components and the system further comprises: two or more second groups of magnetic field-producing components arranged to participate in producing the magnetic field with the first group of magnetic field-producing components, wherein each second group of magnetic field-producing components includes an electromagnetic coil, a plurality of supply circuits, a plurality of sensor circuits, and a protection circuit; and a master protection circuit connected to the protection circuit in the first group of magnetic field-producing components and each protection circuit in the two or more second groups of magnetic field-producing components.

(12) The system of any one of configurations (1) or (3) through (11), wherein the electromagnetic coil is a first electromagnetic coil, the magnetic field is a first magnetic field, the current is a first current, the plurality of supply circuits is a first plurality of supply circuits, the plurality of supply lines is a first plurality of supply lines, the plurality of sensor circuits is a first plurality of sensor circuits, the activated supply circuit is a first activated supply circuit, the sensor circuit is a first sensor circuit, the at least one sensor signal is or are at least one first sensor signal, the protection circuit is a first protection circuit, the multi-way input circuit is a first multi-way input circuit, the multi-way output circuit is a first multi-way output circuit, and the at least one firing signal is or are at least one first firing signal the system further comprising: a second electromagnetic coil to produce a second magnetic field in response to a second current flowing in the second electromagnetic coil; a second plurality of supply circuits coupled to the second electromagnetic coil with a second plurality of supply lines, each supply circuit of the second plurality of supply circuits having two input channels such that each supply circuit is controllable by a third input signal on a first input channel of the two input channels or a fourth input signal on a second input channel of the two input channels to provide a portion of the second current to the second electromagnetic coil for producing the second magnetic field; a second plurality of sensor circuits coupled to the second plurality of supply lines, wherein each second sensor circuit of the second plurality of sensor circuits is configured to detect activation of a second activated supply circuit of the second plurality of supply circuits that is coupled to a supply line of the second plurality of supply lines to which the second sensor circuit of the second plurality of sensor circuits is coupled and wherein the activation comprises initiating delivery of the portion of the second current from the second activated supply circuit to the second electromagnetic coil; and a second protection circuit coupled to the second plurality of sensor circuits and to the second plurality of supply circuits, the protection circuit comprising: a second multi-way input circuit to receive at least one second sensor signal from the second plurality of sensor circuits that indicates activation of the second activated supply circuit; and a second multi-way output circuit coupled to the second multi-way input circuit to output, in response to receipt of the second sensor signal by the second multi-way input circuit, at least two second firing signals simultaneously to at least one second supply circuit of the second plurality of supply circuits other than the second activated supply circuit and to the first protection circuit, wherein at least one of the second firing signals causes delivery of the portion of the second current from the at least one second supply circuit simultaneous with delivery of the portion of the second current from the second activated supply circuit.

(13) The system of any one of configurations (1) through (12), wherein the electromagnetic coil carries a peak current in a range from 1,000 amps to 200,000,000 amps for a period of time less than 100 milliseconds.

(14) The system of configuration (13), wherein the electromagnetic coil produces or participates in producing with one or more additional electromagnetic coils in the system a peak magnetic field having a value in a range from 10 Tesla to 40 Tesla when carrying the peak current.

(15) The system of configuration (14), wherein the plurality of supply circuits activate repeatedly at least 1,000 times during operation of the system without replacing a component of the system.

(16) A method for applying a plurality of currents to at least one electromagnetic coil in a system to produce a magnetic field, the method comprising: monitoring, with a protection circuit, for a sensor signal from a plurality of sensor circuits that are coupled to a plurality of supply lines that couple a plurality of supply circuits to the at least one electromagnetic coil, wherein the sensor signal indicates activation of a supply circuit of the plurality of supply circuits to deliver a first amount of current from the activated supply circuit to an electromagnetic coil of the at least one electromagnetic coil for producing the magnetic field; receiving, at the protection circuit, the sensor signal from one sensor circuit of the plurality of sensor circuits; and outputting, from the protection circuit to at least one supply circuit of the plurality of supply circuits other than the activated supply circuit, at least one firing signal in response to receipt of the sensor signal that cause or causes the at least one supply circuit of the plurality of supply circuits to deliver a second amount of current to the electromagnetic coil simultaneous with delivery of the first amount of current by the activated supply circuit.

(17) The method of (16), further comprising producing the magnetic field in response to delivering the second amount of current.

(18) The method of (16) or (17), further comprising issuing a command with a controller that causes the activated supply circuit of the plurality of supply circuits to initiate delivery of the first amount of current to the at least one electromagnetic coil.

(19) The method of any one of (16) through (18), further comprising sensing, by each sensor circuit of the plurality of sensor circuits, flow of current in each supply line of the plurality of supply lines with a Rogowski coil.

(20) The method of (19), further comprising: driving an optical diode directly with an output from the Rogowski coil to produce an optical pulse; and transmitting the optical pulse as the sensor signal to the protection circuit with an optical fiber.

(21) The method of (20), further comprising dividing, with a current divider, current from the Rogowski coil into a first circuit branch and a second circuit branch that is connected in parallel with the first circuit branch, wherein: the first circuit branch includes a first resistor connected in series with the optical diode; the second circuit branch includes a second resistor; and a first resistance value of the first resistor and a second resistance value of the second resistor determine a threshold condition above which the optical diode will produce the optical pulse.

(22) The method of any one of (16) through (21), further comprising: converting, with an input circuit of the protection circuit, an optical signal received as the sensor signal from the one sensor circuit to an electrical signal; and converting, by the protection circuit, the electrical signal to the at least one firing signal, wherein the at least one firing signal is an optical signal or are optical signals.

(23) The method of (22), wherein the amount of time to convert the received optical signal to the electrical signal and to convert the electrical signal to the at least one firing signal is no greater than 50 nanoseconds.

(24) The method of any one of (16) through (23), wherein the at least one firing signal is or are at least one first firing signal, the method further comprising: outputting, from a delay circuit in the protection circuit, a delayed signal that is delayed by a selected amount of time with respect to a first firing signal of the at least one first firing signal.

(25) The method of any one of (16) through (24), wherein delivering the second amount of current to the at least one electromagnetic coil comprises delivering a peak current in a range from 1,000 amps to 200,000,000 amps for a period of time less than 100 milliseconds.

(26) The method of any one of (16) through (25), further comprising: producing by the at least one electromagnetic coil, in response to delivering the second amount of current, a magnetic field within a cavity having a peak value in a range from 10 Tesla to 40 Tesla.

(27) The method of (26), further comprising: repeating the delivery of the second amount of current and producing the magnetic field at least 1000 times without replacing a component of the system.

(28) A protection circuit comprising: a multi-way input circuit having a plurality of input circuits to receive in parallel a plurality of input signals; a decision circuit coupled to the plurality of input circuits to output a control signal in response to receipt, by any one of the plurality of input circuits, of a first input signal of the plurality of input signals that qualifies as a triggering signal; and a multi-way output circuit coupled to the decision circuit to output a plurality of firing signals simultaneously in response to receiving the control signal from the decision circuit.

(29) The protection circuit of configuration (28), wherein the multi-way input circuit or the decision circuit is configured to determine whether the first input signal qualifies as the triggering signal.

(30) The protection circuit of configuration (28) or (29), wherein each input circuit of the plurality of input circuits comprises an optoisolator to receive an optical signal as an input signal of the plurality of input signals.

(31) The protection circuit of any one of configurations (28) through (30), wherein the multi-way output circuit comprises a plurality of electro-optic transducers and the plurality of firing signals are optical signals.

(32) The protection circuit of any one of configurations (28) through (31), wherein a response time of the protection circuit, from receipt of the first input signal that qualifies as the triggering signal to output of the plurality of firing signals, is between 3 nanoseconds and 50 nanoseconds.

(33) The protection circuit of any one of configurations (28) through (32), wherein the control signal is a first control signal, the method further comprising a delay circuit coupled to the decision circuit, wherein the delay circuit is configured to output at least one second control signal that is delayed in time with respect to any one of the plurality of firing signals.

(34) A method of assembling a protection circuit, the method comprising: assembling a multi-way input circuit having a plurality of input circuits to receive in parallel a plurality of input signals; coupling a decision circuit to the plurality of input circuits to output a first control signal in response to receipt, by any one of the plurality of input circuits, of a first input signal of the plurality of input signals that qualifies as a triggering signal; coupling a multi-way output circuit to the decision circuit; and configuring the multi-way output circuit to output a plurality of second control signals simultaneously in response to receiving the first control signal from the decision circuit.

(35) The method of (34), wherein assembling the multi-way input circuit comprises including an optoisolator in each input circuit of the plurality of input circuits to receive an optical signal as an input signal of the plurality of input signals.

(36) The method of (34) or (35), wherein coupling the multi-way output circuit comprises coupling a plurality of electro-optic transducers in parallel to the decision circuit, wherein the electro-optic transducers are each configured to output an optical signal as a second control signal of the plurality of second control signals.

(37) The method of any one of (34) through (35), further comprising coupling a delay circuit to the decision circuit, wherein the delay circuit is configured to output at least one third control signal that is delayed in time with respect to any one of the plurality of second control signals.

(38) A system comprising: an electrical load to receive current; a plurality of supply circuits coupled to the electrical load with a plurality of supply lines, wherein each supply circuit of the plurality of supply circuits has at least one input channel to receive a first input signal that causes the supply circuit of the plurality of supply circuits to provide a portion of the current to the electrical load; a plurality of sensor circuits coupled to the plurality of supply lines, wherein each sensor circuit of the plurality of sensor circuits is configured to detect activation of an activated supply circuit of the plurality of supply circuits coupled to a supply line of the plurality of supply lines to which the sensor circuit is coupled, wherein the activation comprises initiating delivery of the portion of the current to the electrical load; a controller coupled to at least one controlled supply circuit of the plurality of supply circuits to provide the first input signal to activate at least the controlled supply circuit; and a protection circuit coupled to the plurality of sensor circuits and to the plurality of supply circuits, the protection circuit comprising: a multi-way input circuit to receive at least one sensor signal from the plurality of sensor circuits that indicates activation of the activated supply circuit; and a multi-way output circuit coupled to the multi-way input circuit to output, in response to receipt of the at least one sensor signal by the first multi-way input circuit, at least one firing signal to at least one of the plurality of supply circuits other than the activated supply circuit, wherein the at least one firing signal causes delivery of the portion of the current from the at least one supply circuit simultaneous with delivery of the portion of the current from the activated supply circuit.

(39) A system comprising: a plurality of electrical loads to receive a plurality of currents; a plurality of supply circuits coupled to the plurality of electrical loads with a plurality of supply lines, wherein each supply circuit of the plurality of supply circuits has at least one input channel to receive a first input signal that causes the supply circuit of the plurality of supply circuits to provide a portion of the plurality of currents to an electrical load of the plurality of electrical loads that is connected to the supply circuit of the plurality of supply circuits; a plurality of sensor circuits coupled to the plurality of supply lines, wherein each sensor circuit of the plurality of sensor circuits is configured to detect activation of an activated supply circuit of the plurality of supply circuits that is coupled to a supply line of the plurality of supply lines to which the sensor circuit is coupled, wherein the activation comprises initiating delivery of the portion of the plurality of currents to an electrical load of the plurality of electrical loads that is connected to the activated supply circuit; a controller coupled to at least one controlled supply circuit of the plurality of supply circuits to provide the first input signal to activate at least the controlled supply circuit; and a protection circuit coupled to the plurality of sensor circuits and to the plurality of supply circuits, the protection circuit comprising: a multi-way input circuit to receive at least one sensor signal from the plurality of sensor circuits that indicates activation of the activated supply circuit; and a multi-way output circuit coupled to the multi-way input circuit to output, in response to receipt of the at least one sensor signal by the first multi-way input circuit, at least one firing signal to at least one of the plurality of supply circuits other than the activated supply circuit, wherein the at least one firing signal causes simultaneous delivery of the portion of the plurality of currents from the at least one supply circuit other than the activated supply circuit with delivery of the portion of the plurality of currents from the activated supply circuit.

(40) The system of configuration (38) or (39), wherein each sensor circuit of the plurality of sensor circuits includes a Rogowski coil that extends around at least part of one supply line of the plurality of supply lines.

(41) The system of configuration (40), wherein each sensor circuit of the plurality of sensor circuits further comprises an optical diode that receives unamplified current from the Rogowski coil to activate the optical diode and output an optical pulse for the at least one sensor signal.

(42) The system of configuration (40) or (41), wherein each sensor circuit further includes a current divider connected to an output of the Rogowski coil, the current divider comprising: the optical diode in series with a first resistor in a first circuit branch of the current divider; and a second resistor in a second circuit branch of the current divider that is in parallel with the first circuit branch, wherein a first resistance value of the first resistor and a second resistance value of the second resistor are selected to determine a threshold condition above which the optical diode will output the optical pulse.

(43) The system of any one of configurations (40) through (42), wherein each sensor circuit of the plurality of firing sensor circuits further comprises at least one optical fiber to receive the optical pulse from the optical diode and to transmit the received optical pulse to one input of the multi-way input circuit.

(44) The system of one of configurations (40) through (43), wherein each input of the multi-way input circuit comprises an opto-electronic transducer to convert a received optical sensor signal from a sensor circuit of the plurality of sensor circuits into an electronic signal that produces a pulse which is transmitted to the multi-way output circuit.

(45) The system of one of configurations (40) through (44), wherein the multi-way output circuit comprises a plurality of transducers to convert received electrical signals into optical firing signals that are output from the protection circuit as the at least one firing signal.

(46) The system of one of configurations (40) through (45), wherein the protection circuit further comprises: a delay circuit coupled to the multi-way input circuit to output a delayed signal that is delayed with respect to a second signal received from the multi-way input circuit; and an output circuit coupled to the delay circuit, to receive the delayed signal and output at least one optical signal that is delayed with respect to the at least one firing signal.

(47) The system of configuration (45), wherein the protection circuit further comprises a switch connected between the multi-way input circuit and the delay circuit, the switch having a first control input to disconnect the multi-way input circuit from the multi-way output circuit.

(48) The system of one of configurations (40) through (47), wherein the electrical load or plurality of electrical loads is or are at least one electromagnetic coil to produce a magnetic field in response to the current flowing in the at least one electromagnetic coil.

(49) The system of one of configurations (38) or (40) through (47), wherein the electrical load is a first electrical load, the current is a first current, the plurality of supply circuits is a first plurality of supply circuits, the plurality of supply lines is a first plurality of supply lines, the plurality of sensor circuits is a first plurality of sensor circuits, the at least one input channel is at least one first input channel, the sensor circuit is a first sensor circuit, the at least one sensor signal is or are at least one first sensor signal, the activated supply circuit is a first activated supply circuit, the protection circuit is a first protection circuit, the at least one firing signal is or are at least one first firing signal, the multi-way input circuit is a first multi-way input circuit, and the multi-way output circuit is a first multi-way output circuit, the system further comprising: a second electrical load to receive a second current; a second plurality of supply circuits coupled to the second electrical load with a second plurality of supply lines, wherein each supply circuit of the second plurality of supply circuits has at least one second input channel to receive a second input signal that causes the supply circuit of the second plurality of supply circuits to provide a portion of the second current to the second electrical load; a second plurality of sensor circuits coupled to the second plurality of supply lines, wherein each sensor circuit of the second plurality of sensor circuits is configured to detect activation of a second activated supply circuit of the second plurality of supply circuits that is coupled to a supply line of the second plurality of supply lines to which the sensor circuit of the second plurality of sensor circuits is coupled and wherein the activation comprises initiating delivery of the portion of the second current to the second electromagnetic coil; and a second protection circuit coupled to the second plurality of sensor circuits and to the second plurality of supply circuits, the second protection circuit comprising: a second multi-way input circuit to receive at least one second sensor signal from the second plurality of sensor circuits that indicates activation of the second activated supply circuit; and a second multi-way output circuit coupled to the second multi-way input circuit to output, in response to receipt of the second sensor signal by the second multi-way input circuit, at least two second firing signals simultaneously to at least one second supply circuit of the second plurality of supply circuits other than the second activated supply circuit and to the first protection circuit, wherein at least one of the at least two second firing signals causes simultaneous delivery of the portion of the second current from the at least one second supply circuit with delivery of the portion of the second current from the second activated supply circuit.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the components so conjoined, i.e., components that are conjunctively present in some cases and disjunctively present in other cases. Multiple components listed with "and/or" should be construed in the same fashion, i.e., "one or more" of the components so conjoined. Other components may optionally be present other than the components specifically identified by the "and/or" clause, whether related or unrelated to those components specifically identified. Thus, as a non-limiting example, a reference to "A and/or B", when used in conjunction with open-ended language such as "comprising" can refer, in one embodiment, to A only (optionally including components other than B); in another embodiment, to B only (optionally including components other than A); in yet another embodiment, to both A and B (optionally including other components); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of components, and, optionally, additional unlisted items. Only terms clearly indicated to the contrary, such as "only one of" or "exactly one of," or, when used in the claims, "consisting of," will refer to the inclusion of exactly one component of a number or list of components. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more components, should be understood to mean at least one component selected from any one or more of the components in the list of components, but not necessarily including at least one of each and every component specifically listed within the list of components and not excluding any combinations of components in the list of components. This definition also allows that components may optionally be present other than the components specifically identified within the list of components to which the phrase "at least one" refers, whether related or unrelated to those components specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including components other than B); in another embodiment, to at least one, optionally including more than one, B, with no A present (and optionally including components other than A); in yet another embodiment, to at least one, optionally including more than one, A, and at least one, optionally including more than one, B (and optionally including other components); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising:

an electromagnetic coil to produce a magnetic field in response to current flowing in the electromagnetic coil;

a plurality of supply circuits coupled to the electromagnetic coil with a plurality of supply lines, each supply circuit of the plurality of supply circuits having two input channels such that each supply circuit of the plurality of supply circuits is controllable, by a first input signal on a first input channel of the two input channels or a second input signal on a second input channel of the two input channels, to output at least a portion of the current to the electromagnetic coil for producing the magnetic field;

a plurality of sensor circuits coupled to the plurality of supply lines, wherein each sensor circuit of the plurality of sensor circuits is configured to detect activation of a supply circuit of the plurality of supply circuits that is coupled to a supply line of the plurality of supply lines to which the sensor circuit is coupled, and wherein the activation comprises initiating delivery of the portion of the current from the supply circuit to the electromagnetic coil through the supply line to which the sensor circuit is coupled;

a controller coupled to at least one controlled supply circuit of the plurality of supply circuits to provide the first input signal to activate at least the one controlled supply circuit; and a protection circuit coupled to the plurality of sensor circuits and to the plurality of supply circuits, the protection circuit comprising:

a multi-way input circuit to receive at least one sensor signal from the plurality of sensor circuits that indicates activation of the activated supply circuit; and a multi-way output circuit coupled to the multi-way input circuit to output, in response to receipt of the sensor signal by the multi-way input circuit, at least one firing signal to at least one supply circuit of the plurality of supply circuits other than the activated supply circuit, wherein each firing signal of the at least one firing signal is delivered as the second input signal to the at least one supply circuit and causes delivery of the portion of the current from the at least one supply circuit simultaneous with delivery of the portion of the current from the activated supply circuit.

2. A method for applying a plurality of currents to at least one electromagnetic coil in a system to produce a magnetic field, the method comprising:

monitoring, with a protection circuit, for a sensor signal from a plurality of sensor circuits that are coupled to a plurality of supply lines that couple a plurality of supply circuits to the at least one electromagnetic coil, wherein the sensor signal indicates activation of a supply circuit of the plurality of supply circuits to deliver a first amount of current from the activated supply circuit to an electromagnetic coil of the at least one electromagnetic coil for producing the magnetic field;

receiving, at the protection circuit, the sensor signal from one sensor circuit of the plurality of sensor circuits; and outputting, from the protection circuit to at least one supply circuit of the plurality of supply circuits other than the activated supply circuit, at least one firing signal in response to receipt of the sensor signal that cause or causes the at least one supply circuit of the plurality of supply circuits to deliver a second amount of current to the electromagnetic coil simultaneous with delivery of the first amount of current by the activated supply circuit.

3. A system comprising:

a plurality of electromagnetic coils to produce a magnetic field in response to a plurality of currents flowing in the plurality of electromagnetic coils;

a plurality of supply circuits coupled to the plurality of electromagnetic coils with a plurality of supply lines, each supply circuit of the plurality of supply circuits having two input channels such that each supply circuit of the plurality of supply circuits is controllable, by a first input signal on a first input channel of the two input channels or a second input signal on a second input channel of the two input channels, to provide a portion of the plurality of currents to an electromagnetic coil of the plurality of electromagnetic coils that is connected to the supply circuit of the plurality of supply circuits;

a plurality of sensor circuits coupled to the plurality of supply lines, wherein each sensor circuit of the plurality of sensor circuits is configured to detect activation of an activated supply circuit of the plurality of supply circuits, wherein the activation comprises initiating delivery of the portion of the plurality of currents from the activated supply circuit to an electromagnetic coil of the plurality of electromagnetic coils that is connected to the activated supply circuit;

a controller coupled to at least one controlled supply circuit of the plurality of supply circuits to provide the first input signal to activate at least the one controlled supply circuit; and a protection circuit coupled to the plurality of sensor circuits and to the plurality of supply circuits, the protection circuit comprising:

a multi-way input circuit to receive at least one sensor signal from the plurality of sensor circuits that indicates activation of the activated supply circuit; and a multi-way output circuit coupled to the multi-way input circuit to output, in response to receipt of the sensor signal by the multi-way input circuit, at least one firing signal to at least one supply circuit of the plurality of supply circuits, wherein the at least one firing signal is delivered as the second input signal to the at least one supply circuit and causes delivery of the portion of the plurality of currents from the at least one supply circuit simultaneous with delivery of the portion of the plurality of currents from the activated supply circuit.

4. The system of claim 1, wherein each sensor circuit of the plurality of sensor circuits includes a Rogowski coil that extends around at least part of one supply line of the plurality of supply lines.

5. The system of claim 1, wherein each input of the multi-way input circuit comprises an opto-electronic transducer to convert a received optical sensor signal from a sensor circuit of the plurality of sensor circuits into an electronic signal that produces a pulse which is transmitted to the multi-way output circuit.

6. The system of claim 1, wherein the protection circuit further comprises:

a delay circuit coupled to the multi-way input circuit to output a first signal that is delayed with respect to a second signal received from the multi-way input circuit; and an output circuit coupled to the delay circuit, to receive the first signal and output at least one optical signal that is delayed with respect to the at least one firing signal.

7. The system of claim 1, wherein the electromagnetic coil, the plurality of supply circuits, the plurality of sensor circuits, and the protection circuit belong to a first group of magnetic field-producing components and the system further comprises:

two or more second groups of magnetic field-producing components arranged to participate in producing the magnetic field with the first group of magnetic field-producing components, wherein each second group of magnetic field-producing components includes an electromagnetic coil, a plurality of supply circuits, a plurality of sensor circuits, and a protection circuit; and a master protection circuit connected to the protection circuit in the first group of magnetic field-producing components and each protection circuit in the two or more second groups of magnetic field-producing components.

8. The system of claim 1, wherein the electromagnetic coil is a first electromagnetic coil, the magnetic field is a first magnetic field, the current is a first current, the plurality of supply circuits is a first plurality of supply circuits, the plurality of supply lines is a first plurality of supply lines, the plurality of sensor circuits is a first plurality of sensor circuits, the activated supply circuit is a first activated supply circuit, the sensor circuit is a first sensor circuit, the at least one sensor signal is or are at least one first sensor signal, the protection circuit is a first protection circuit, the multi-way input circuit is a first multi-way input circuit, the multi-way output circuit is a first multi-way output circuit, and the at least one firing signal is or are at least one first firing signal the system further comprising:

a second electromagnetic coil to produce a second magnetic field in response to a second current flowing in the second electromagnetic coil;

a second plurality of supply circuits coupled to the second electromagnetic coil with a second plurality of supply lines, each supply circuit of the second plurality of supply circuits having two input channels such that each supply circuit is controllable by a third input signal on a first input channel of the two input channels or a fourth input signal on a second input channel of the two input channels to provide a portion of the second current to the second electromagnetic coil for producing the second magnetic field;

a second plurality of sensor circuits coupled to the second plurality of supply lines, wherein each second sensor circuit of the second plurality of sensor circuits is configured to detect activation of a second activated supply circuit of the second plurality of supply circuits that is coupled to a supply line of the second plurality of supply lines to which the second sensor circuit of the second plurality of sensor circuits is coupled and wherein the activation comprises initiating delivery of the portion of the second current from the second activated supply circuit to the second electromagnetic coil; and a second protection circuit coupled to the second plurality of sensor circuits and to the second plurality of supply circuits, the protection circuit comprising:

a second multi-way input circuit to receive at least one second sensor signal from the second plurality of sensor circuits that indicates activation of the second activated supply circuit; and a second multi-way output circuit coupled to the second multi-way input circuit to output, in response to receipt of the second sensor signal by the second multi-way input circuit, at least two second firing signals simultaneously to at least one second supply circuit of the second plurality of supply circuits other than the second activated supply circuit and to the first protection circuit, wherein at least one of the second firing signals causes delivery of the portion of the second current from the at least one second supply circuit simultaneous with delivery of the portion of the second current from the second activated supply circuit.

9. The system of claim 1, wherein the electromagnetic coil carries a peak current in a range from 1,000 amps to 200,000,000 amps for a period of time less than 100 milliseconds.

10. The method of claim 2, further comprising producing the magnetic field in response to delivering the second amount of current.

11. The method of claim 2, further comprising:

issuing a command with a controller that causes the activated supply circuit of the plurality of supply circuits to initiate delivery of the first amount of current to the at least one electromagnetic coil.

12. The method of claim 2, further comprising:

sensing, by each sensor circuit of the plurality of sensor circuits, flow of current in each supply line of the plurality of supply lines with a Rogowski coil.

13. The system of claim 4, wherein each sensor circuit of the plurality of sensor circuits further comprises an optical diode that receives unamplified current from the Rogowski coil to activate the optical diode and output an optical pulse for the at least one sensor signal.

14. The system of claim 1, wherein the multi-way output circuit comprises a plurality of transducers to convert received electrical signals into optical firing signals that are output from the protection circuit as the at least one firing signal.

15. The system of claim 6, wherein the protection circuit further comprises:

a switch connected between the multi-way input circuit and the delay circuit, the switch having a first control input to disconnect the multi-way input circuit from the multi-way output circuit.

16. The system of claim 9, wherein the electromagnetic coil produces or participates in producing with one or more additional electromagnetic coils in the system a peak magnetic field having a value in a range from 10 Tesla to 40 Tesla when carrying the peak current.

17. The method of claim 12, further comprising:

driving an optical diode directly with an output from the Rogowski coil to produce an optical pulse; and transmitting the optical pulse as the sensor signal to the protection circuit with an optical fiber.

18. The system of claim 16, wherein the plurality of supply circuits activate repeatedly at least 1,000 times during operation of the system without replacing a component of the system.

19. The system of claim 13, wherein each sensor circuit further includes a current divider connected to an output of the Rogowski coil, the current divider comprising:

the optical diode in series with a first resistor in a first circuit branch of the current divider; and a second resistor in a second circuit branch of the current divider that is in parallel with the first circuit branch, wherein a first resistance value of the first resistor and a second resistance value of the second resistor are selected to determine a threshold condition above which the optical diode will output the optical pulse.

20. The system of claim 13, wherein each sensor circuit of the plurality of sensor circuits further comprises at least one optical fiber to receive the optical pulse from the optical diode and to transmit the received optical pulse to one input of the multi-way input circuit.

* * * * *